(12) United States Patent
Wada

(10) Patent No.: US 6,832,008 B1
(45) Date of Patent: Dec. 14, 2004

(54) IMAGE READING APPARATUS AND METHOD, AND STORAGE MEDIUM

(75) Inventor: Hiroyuki Wada, Yokohama (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 09/399,716

(22) Filed: Sep. 21, 1999

(30) Foreign Application Priority Data

| Sep. 25, 1998 | (JP) | 10-271584 |
| Oct. 5, 1998 | (JP) | 10-282562 |
| Oct. 5, 1998 | (JP) | 10-282563 |

(51) Int. Cl.[7] .................................. G06K 9/40
(52) U.S. Cl. ................................... 382/275
(58) Field of Search .................. 382/191, 254, 382/275, 312, 318; 356/237.1, 239.1; 355/27, 40, 41, 82; 250/330, 341.8; 358/487; 396/567, 570, 604, 639

(56) References Cited

U.S. PATENT DOCUMENTS

| 4,933,983 A | | 6/1990 | Hiramatsu et al. |
| 5,036,405 A | | 7/1991 | Kojima |
| 5,266,805 A | | 11/1993 | Edgar |
| 5,969,372 A | | 10/1999 | Stavely et al. |
| 5,991,010 A | * | 11/1999 | Nishio ......................... 355/82 |
| 6,075,590 A | * | 6/2000 | Edgar ...................... 356/237.1 |
| 6,195,161 B1 | * | 2/2001 | Edgar ...................... 356/237.1 |
| 6,540,416 B2 | * | 4/2003 | Edgar et al. ................. 396/567 |

FOREIGN PATENT DOCUMENTS

| JP | 63-129470 | 6/1988 |
| JP | 6-28468 | 2/1994 |

* cited by examiner

Primary Examiner—Jose L. Couso
(74) Attorney, Agent, or Firm—Morgan & Finnegan, LLP

(57) ABSTRACT

A film scanner irradiates a film with visible light and infrared light to read image data. Infrared image data and visible light image data are compared, and any shift therebetween is corrected to accurately specify a dust particle/flaw region.

45 Claims, 27 Drawing Sheets

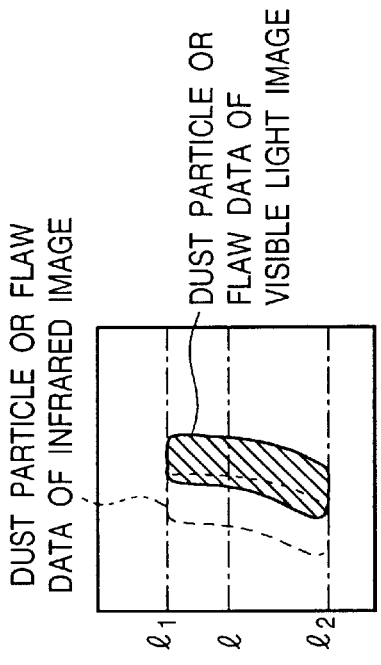
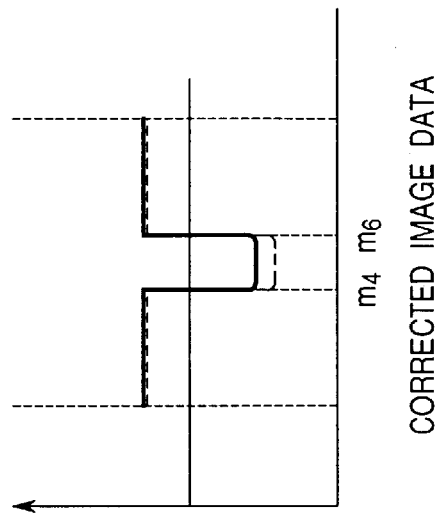
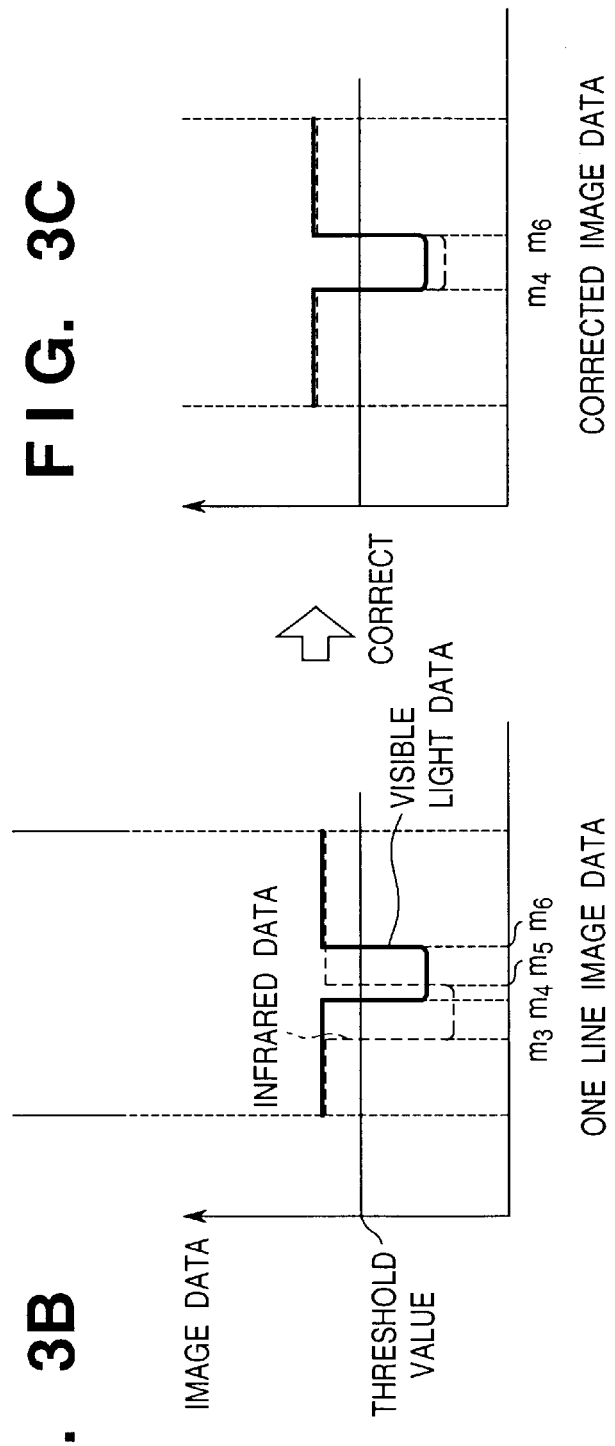

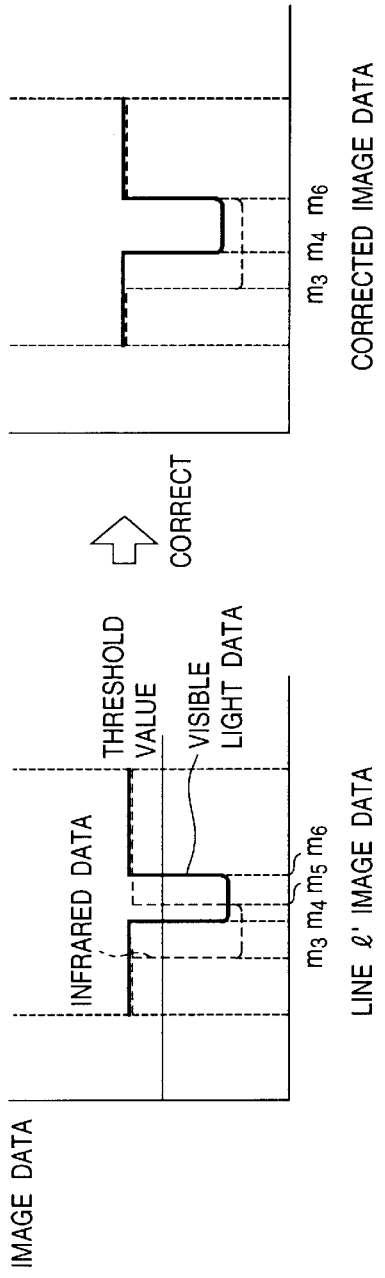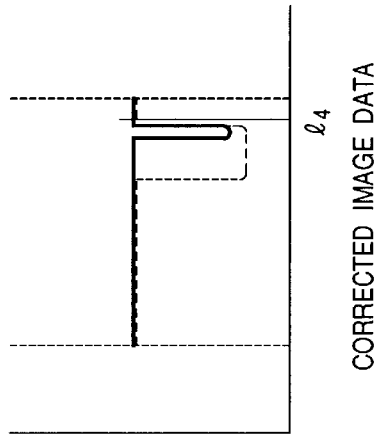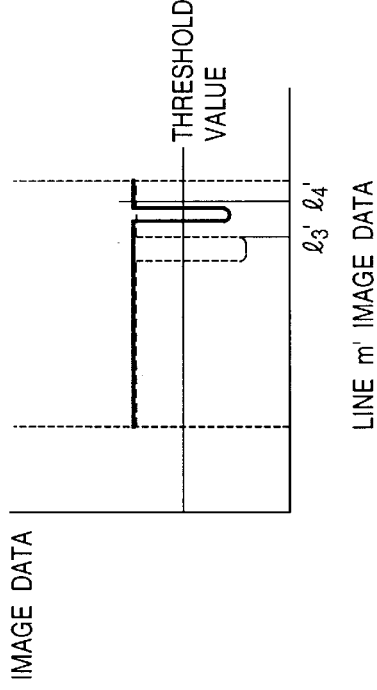

- DUST PARTICLE DATA OF INFRARED IMAGE
- DUST PARTICLE OR FLAW DATA OF VISIBLE LIGHT IMAGE

⇩ CORRECT

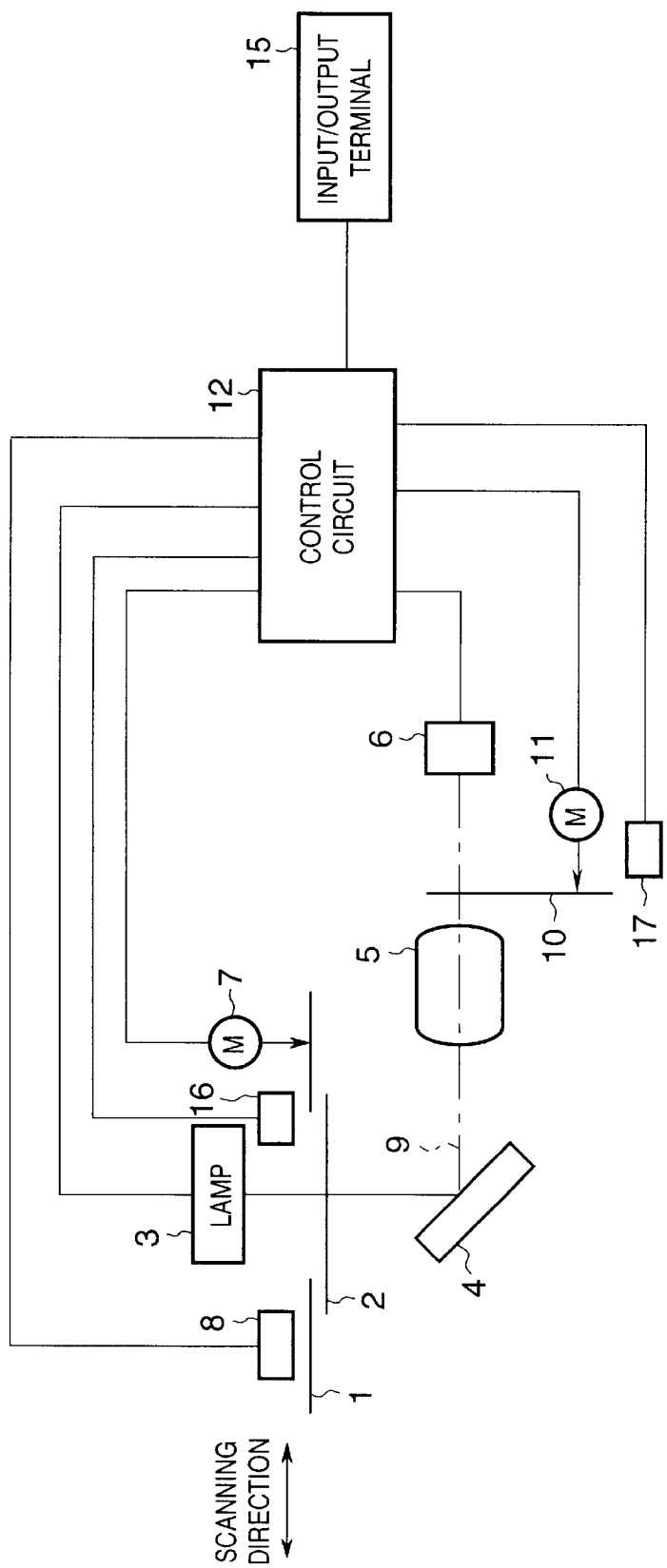

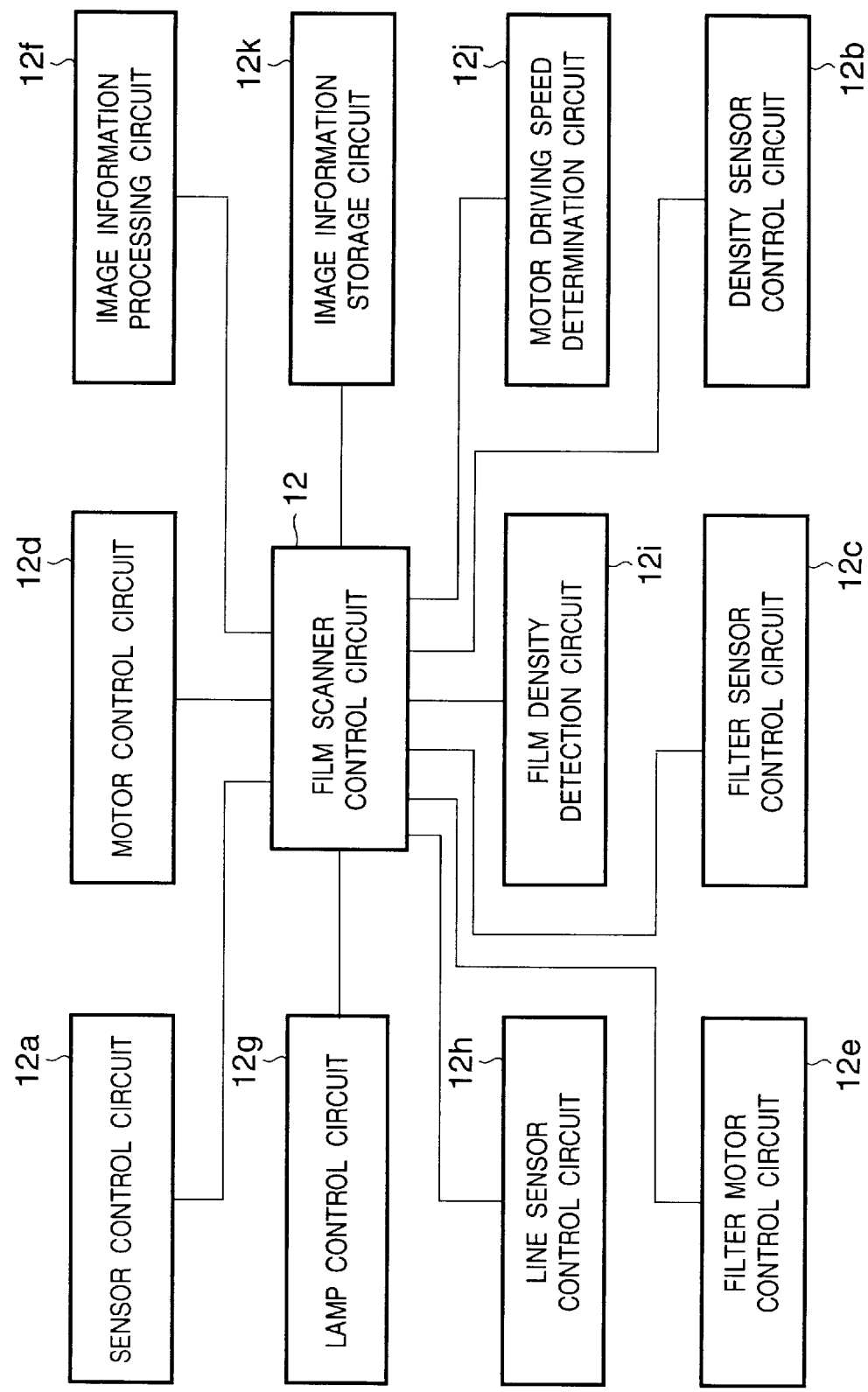

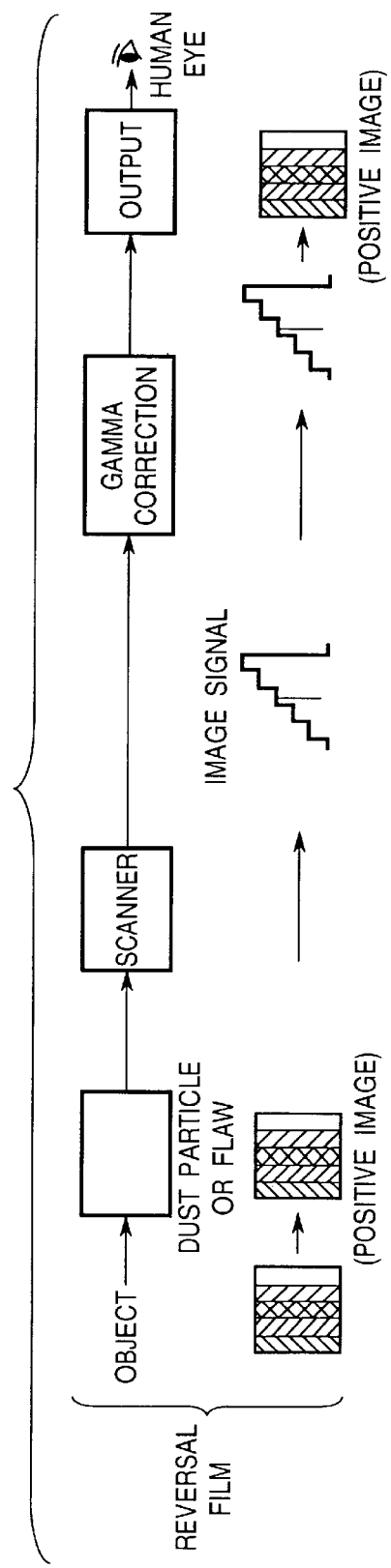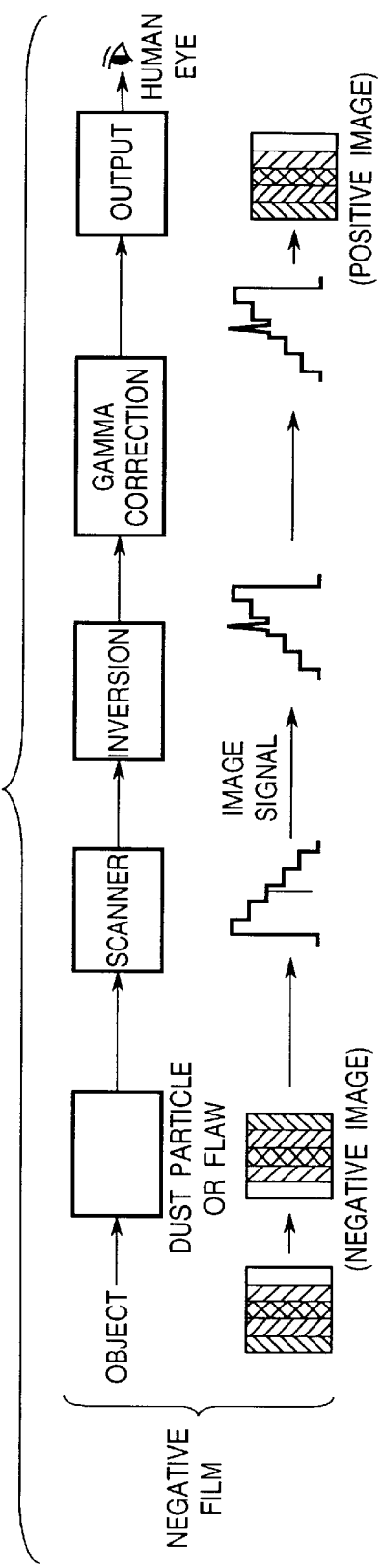

FILM IMAGE

DUST PARTICLE OR FLAW

INFRARED INFORMATION

VISIBLE LIGHT INFORMATION

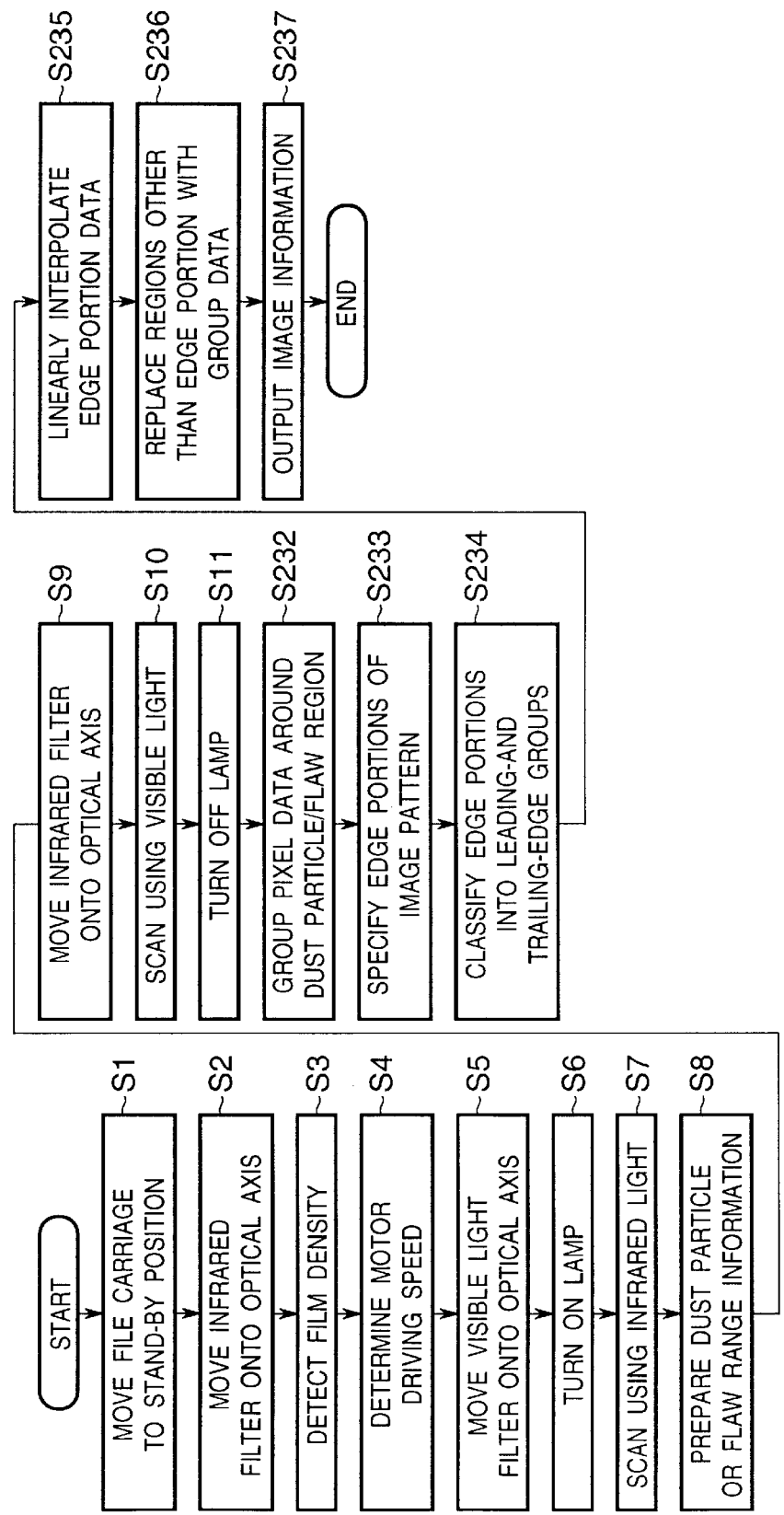

FIG. 24A

|   | a | b | c | d | e | f | g | h | i | j | k | l | m | n |
|---|---|---|---|---|---|---|---|---|---|---|---|---|---|---|
| 1 |   |   |   |   |   | B | B |   |   |   | B |   |   |   |
| 2 |   |   |   |   |   | B |   |   |   | B |   |   |   |   |
| 3 | A | A | A | A | A | B | C | C | C | B | A | A | A | A |
| 4 | A | A | A | A | A | B |   |   |   |   |   |   |   | A |
| 5 | A | A | A | A |   |   |   |   |   |   |   |   |   | A |
| 6 | A | A |   |   |   |   |   |   |   |   |   |   |   | A |
| 7 | A |   |   |   |   |   |   |   |   |   |   |   | A | A |
| 8 | A |   |   |   |   |   |   |   |   |   |   | A | A | A |
| 9 | A |   |   |   |   |   |   |   |   | A | A | A | A | A |
| 10| A | A | A | A | B | C | C | C | B | A | A | A | A | A |
| 11|   |   |   | A | B |   |   |   | B |   |   |   |   |   |
| 12|   |   |   |   |   |   |   |   |   |   |   |   |   |   |

FIG. 24B

|   | a | b | c | d | e | f | g | h | i | j | k | l | m | n |
|---|---|---|---|---|---|---|---|---|---|---|---|---|---|---|
| 1 |   |   |   |   |   |   |   |   |   |   |   |   |   |   |
| 2 |   |   |   |   |   | B |   |   |   | B |   |   |   |   |
| 3 |   |   |   |   |   | B | C | C | C | B | A | A | A |   |
| 4 |   |   |   |   | A | B |   |   |   | B |   |   |   | A |
| 5 |   |   |   |   | A | A |   |   |   | B |   |   |   | A |
| 6 | A | A |   |   |   | B |   |   |   | B |   |   |   | A |
| 7 | A |   |   |   |   | B |   |   |   | B |   |   | A | A |
| 8 | A |   |   |   | B |   |   |   |   |   |   | A |   |   |
| 9 | A |   |   |   |   | B |   |   |   | B | A | A |   |   |
| 10| A | A | A | A | B | C | C | C | B |   |   |   |   |   |
| 11|   |   |   |   | B |   |   |   | B |   |   |   |   |   |
| 12|   |   |   |   |   |   |   |   |   |   |   |   |   |   |

FIG. 24C

|   | a | b | c | d | e | f | g | h | i | j | k | l | m | n |
|---|---|---|---|---|---|---|---|---|---|---|---|---|---|---|
| 1 |   |   |   |   |   |   |   |   |   |   |   |   |   |   |
| 2 |   |   |   |   |   |   |   |   |   |   |   |   |   |   |
| 3 |   |   |   |   |   | B | C | C | C | B | A | A |   |   |
| 4 |   |   |   |   | A | B | C | C | C | B | A | A | A | A |
| 5 |   |   | A | A | A | B | C | C | C | B | A | A | A | A |
| 6 | A | A | A | A | A | B | C | C | C | B | A | A | A | A |
| 7 | A | A | A | A | A | B | C | C | B | A | A | A | A |   |
| 8 | A | A | A | A | B | C | C | C | B | A | A | A |   |   |
| 9 | A | A | A | A | B | C | C | C | B | A | A |   |   |   |
| 10| A | A | A | A | B | C | C | C | B | A |   |   |   |   |
| 11|   |   |   |   |   |   |   |   |   |   |   |   |   |   |
| 12|   |   |   |   |   |   |   |   |   |   |   |   |   |   |

IMAGE READING APPARATUS AND METHOD, AND STORAGE MEDIUM

BACKGROUND OF THE INVENTION

The present invention relates to an image reading method and apparatus for reading an original image of, e.g., a developed photographic film, and a storage medium.

In a film scanner as an image reading apparatus, conventionally, a film original (transparent original) such as a microfilm or a photographic film is irradiated by an illumination optical system from the back. The transmitted light is projected to an imaging plane of a photoelectric conversion element through a projection optical system to form an image transmitted by the light onto the imaging plane. The image is photoelectrically converted by the photoelectric conversion element so that the image information of the film original is electrically converted and output.

In such an image reading apparatus, however, anomalies such as flaws or dust particles sticking to the illumination optical system or the projection optical system appear as black spots on the read image data, resulting in degradation in the image.

SUMMARY OF THE INVENTION

The present invention has been made to solve the above problem, and has as its object to provide an image reading apparatus capable of satisfactorily correcting anomalies such as dust particles or flaws to obtain a higher-quality image.

According to the present invention, the foregoing object is attained by providing an image reading apparatus, comprising; light-emitting means for irradiating an original with invisible light and visible light; photodetection means for detecting light from the original irradiated by the light-emitting means to output image data; region detection means for detecting a first image region recognized as anomaly in first image data output by said photodetection means when the original is irradiated with the invisible light from said light-emitting means, and detecting a second image region recognized as anomaly in second image data output by said photodetection means when the original is irradiated with the visible light from said light-emitting means; shift correction means for correcting a shift between the first image region and the second image region; determination means for determining, as an anomalous region on the original, a region in the second image data, which corresponds to the first image region corrected by the shift correction means; and, anomaly correction means for correcting image data in the anomalous region determined by the determination means.

According to another aspect of the present invention, the foregoing object is attained by providing an image reading apparatus, comprising: light-emitting means for irradiating an original with invisible light and visible light; photodetection means for detecting light from the original irradiated by the light-emitting means to output image data; region detection means for detecting a first image region recognized as anomaly in first image data output by said photodetection means when the original is irradiated with the invisible light from said light-emitting means, and detecting an anomalous region corresponding to the first image region in second image data output by said photodetection means when the original is irradiated with the visible light from said light-emitting means; and anomaly correction means for correcting the second image data by amplifying pixel values in the anomalous region detected by said region detection means.

In still another aspect of the present invention, the foregoing object is attained by providing an image reading apparatus, comprising: light-emitting means for irradiating an original with invisible light and visible light; photodetection means for detecting light from the original irradiated by the light-emitting means to output image data; region detection means for detecting a first image region recognized as anomaly in first image data output by said photodetection means when the original is irradiated with the invisible light from said light-emitting means, and detecting an anomalous region corresponding to the first image region in second image data output by said photodetection means when the original is irradiated with the visible light from said light-emitting means, a region corresponding to the first image region as an anomalous region; and anomaly correction means for grouping peripheral region of the anomalous region detected by the region detection means in accordance with pixel values and correcting pixels in the anomalous region, which are sandwiched by pixels of a first group of the peripheral region, to pixel values in the first group.

In still another aspect of the present invention, the foregoing object is attained by providing an image reading method, comprising: an irradiation step of irradiating an original with invisible light and visible light from light-emitting means; a photodetection step of detecting light from the original irradiated in the irradiation step to output image data; a region detection step of detecting a first image region recognized as anomaly in first image data output in the photodetection step when the original is irradiated with the invisible light in the irradiation step, and detecting a second image region recognized as anomaly in second image data output in the photodetection step when the original is irradiated with the visible light in the irradiation step; a shift correction step of correcting a shift between the first image region and the second image region; a determination step of determining, as an anomalous region on the original, a region in the second image data, which corresponds to the first image region corrected in the shift correction step; and an anomaly correction step of correcting image data in the anomalous region determined in the determination step.

In still another aspect of the present invention, the foregoing object is attained by providing an image reading method, comprising: an irradiation step of irradiating an original with invisible light and visible light from light-emitting means; a photodetection step of detecting light from the original irradiated in the irradiation step to output image data; a region detection step of detecting a first image region recognized as anomaly in first image data output in the photodetection step when the original is irradiated with the invisible light in the irradiation step, and detecting an anomalous region corresponding to the first image region in second image data output in the photodetection step when the original is irradiated with the visible light in the irradiation step; and an anomaly correction step of correcting the second image data by amplifying pixel values in the anomalous region detected in the region detection step.

In still another aspect of the present invention, the foregoing object is attained by providing an image reading method, comprising: an irradiation step of irradiating an original with invisible light and visible light from light-emitting means; a photodetection step of detecting light from the original irradiated in the irradiation step to output image data; the region detection step of detecting a first image region recognized as anomaly in first image data output in the photodetection step when the original is irradiated with the invisible light in the irradiation step, and detecting an anomalous region corresponding to the first image region in second image data output in the photodetection step when the original is irradiated with the visible light in the irradiation step; and an anomaly correction step of grouping peripheral region of the anomalous region detected in the region detection step in accordance with pixel values and correcting pixels in the anomalous region, which are sandwiched by pixels of a first group of the peripheral region, to pixel values in the first group.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A to 3C are views for explaining an image data aligning method according to the first embodiment;

FIGS. 6A to 6D are graphs for explaining the image data aligning method according to the second embodiment;

FIG. 11 is a view showing the schematic arrangement of the film scanner shown in FIG. 10;

FIG. 12 is a block diagram showing the circuit arrangement of the film scanner shown in FIG. 10;

FIGS. 13A and 13B are schematic views showing the influence of a dust particle or flaw;

FIGS. 21A to 21C are views showing details of image data in a dust particle/flaw region;

FIG. 23 is a flow chart for explaining the operation of a film scanner according to the seventh embodiment;

FIGS. 24A to 24C are views showing details of image data in a dust particle/flaw region;

FIGS. 27A to 27C are views showing details of image data in a dust particle/flaw region.

DETAILED DESCRIPTION OF THE PREFERRED EMBODIMENTS

<First Embodiment>

(Outline)

When a dust particle or flaw is to be detected and corrected, the data of the detected dust particle or flaw and the entire image data must be accurately aligned in order to compare the data with each other and correct the data. However, strict mechanical alignment is almost impossible because of, e.g., play of the scanning mechanism. The data of a dust particle or flaw may be appropriately expanded, and the image data may be corrected on the basis of the expanded data.

However, when such a film scanner uses the expanded data of a detected dust particle or flaw, it may delete normal image information around the dust particle or flaw. Conversely, when the expansion amount is smaller than the shift amount between two pieces of image information to be compared, dust particles or flaws cannot be sufficiently deleted.

As an image reading apparatus according to the first embodiment of the present invention, a film scanner capable of minimizing any shift between the visible light image and the dust particle or flaw information image of a film image to properly and easily specify the dust particle/flaw region and obtaining a satisfactorily corrected film image will be described.

FIGS. 13A and 13B schematically show the influence of the above-described dust particle or flaw on image data or an output image. FIG. 13A shows the case of a positive film, and FIG. 13B shows the case of a negative film. As shown in FIGS. 13A and 13B, in both the positive film and the negative film, when a film original is read by the film scanner and converted into an image signals, the dust particle or flaw appears as a black spot on the image signal.

As a consequence, in the positive film, the dust particle or flaw directly appears as a black spot because the image signal is directly subjected to image processing such as gamma correction and output to an output device such as a printer.

In the negative film, the image signal read by the film scanner is subtracted from an image signal read at full level, thereby converting the negative image into a positive image. For this reason, the dust particle or flaw appears as a bright white spot on the output image.

The first embodiment exploits specific transmittance characteristics of a film with respect to infrared light. Only a dust particle or flaw which degrades an image is detected using infrared light as invisible light that passes through the original, and the read original data is corrected on the basis of the detected dust particle or flaw information.

(Arrangement)

The arrangement of the film scanner of the first embodiment will be described below. This arrangement is merely an example, and the present invention is not limited to this.

Figure 1:
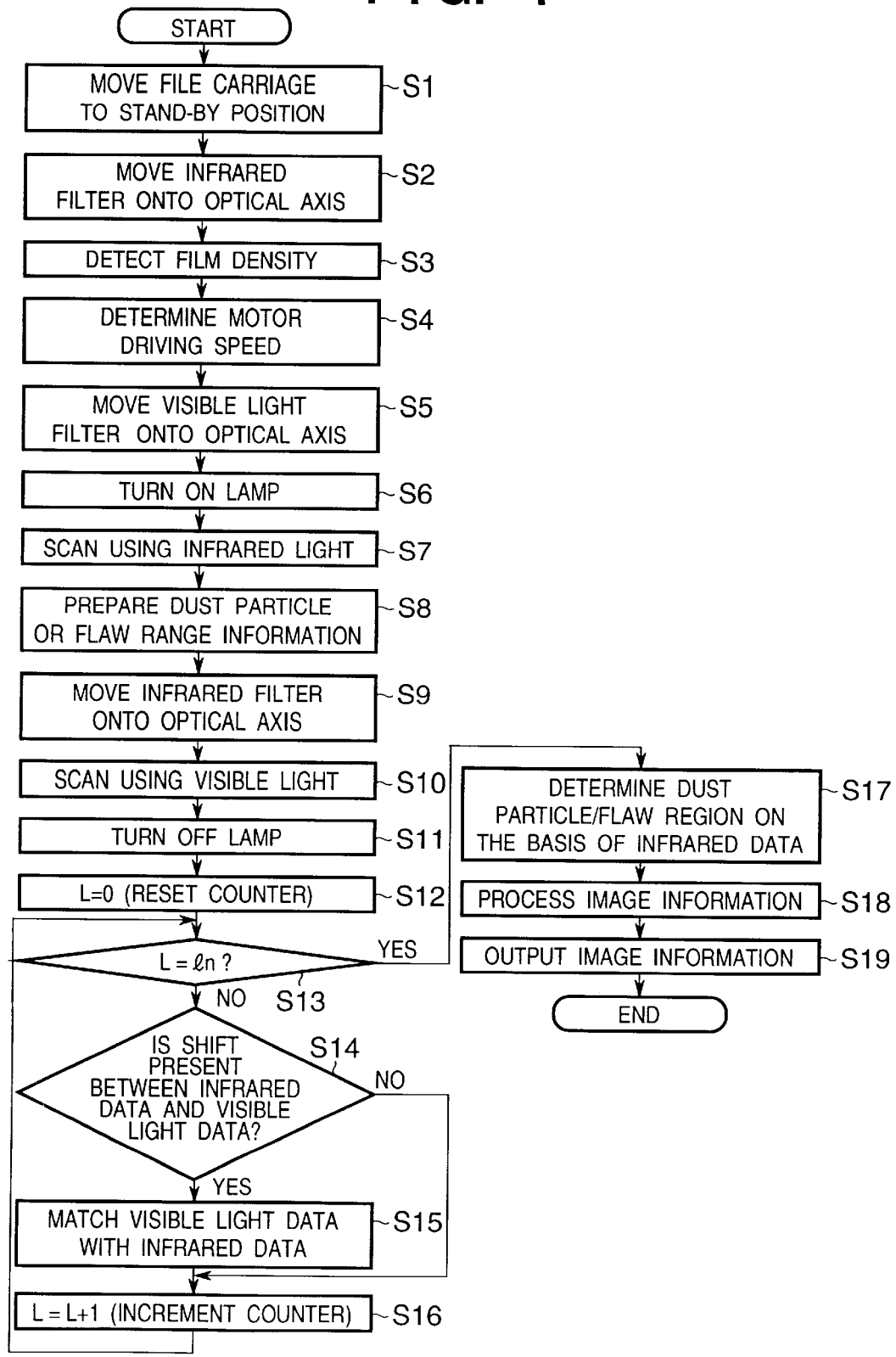
FIG. 1 is a flow chart for explaining the operation of a film scanner according to the first embodiment of the present invention.
Figure 10:
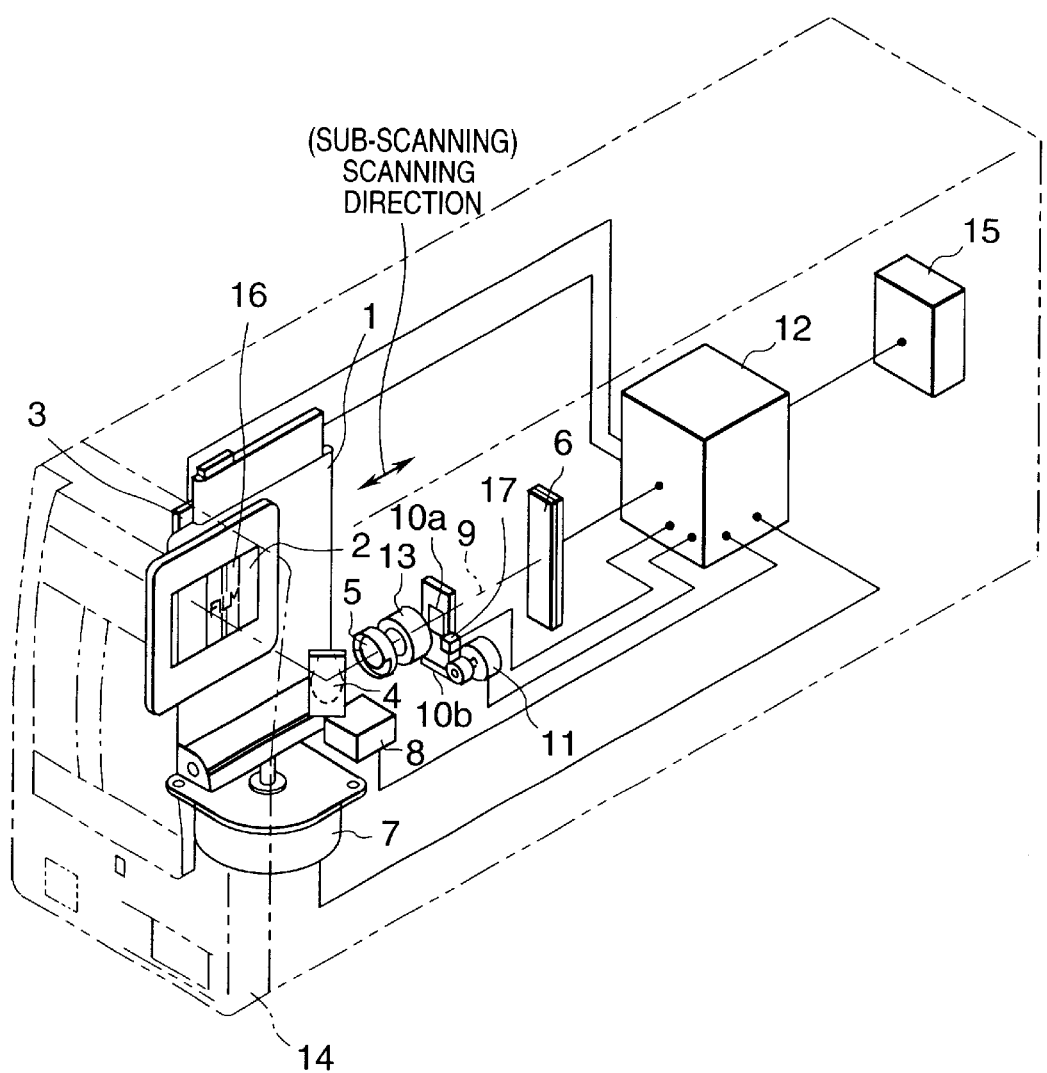
FIG. 10 is a perspective view showing the main part of the film scanner according to the first embodiment of the present invention.

FIG. 10 is a perspective view of the main part of the film scanner. FIG. 11 shows the schematic arrangement of the film scanner shown in FIG. 10. FIG. 12 is a block diagram showing the circuit arrangement of the film scanner shown in FIG. 10. FIG. 1 is a flow chart showing the operation of the film scanner according to the first embodiment. FIGS. 2A to 2D are views showing an image shift between the infrared image data and the visible light image data read by the film scanner, which are compared and synthesized. FIGS. 3A to 3C are views showing correction of a dust particle/flaw region.

Referring to FIG. 10, a developed film 2 as an original to be read is fixed on a film carriage 1 used as an original table. A lamp 3 serving as a light source (light-emitting portion) for illuminating the film 2 has light-emitting characteristics from the visible light range to the infrared wavelength. Light from the lamp 3 passes through the film 2 and is reflected by a mirror 4. An image is formed, via a lens 5, on a line sensor 6 (photodetection means) constituted by, e.g., a CCD. The film density is detected by a density sensor 16. The lens 5 is held by a lens holder 13.

The line sensor 6 has three light-receiving regions: a R (red) light-receiving portion, a G (green) light-receiving portion, and a B (blue) light-receiving portion. The three light-receiving portions are sensitive to red, green, and blue light wavelengths, respectively. At least one of the R (red) light-receiving portion, G (green) light-receiving portion, and B (blue) light-receiving portion is also sensitive to infrared light.

The film carriage 1 is moved in the scanning direction (direction indicated by an arrow in FIG. 10 or 11) by a motor 7. The position of the film carriage 1 is detected by a sensor 8. A filter 10 is disposed on an optical axis 9 from the lamp 3 to the line sensor 6. Driving a filter motor 11 allows switching between an infrared filter 10a for cutting infrared light and a visible light filter 10b for cutting visible light, so one of the filters can be set on the optical axis 9. The position of the filter 10 is detected by a filter sensor 17. These members are protected by an outer case 14 of the film scanner.

The lamp 3, line sensor 6, motor 7, sensor 8, filter motor 11, and input/output terminal 15 are electrically connected to a control circuit 12 (control means) and controlled by the control circuit 12. The control circuit 12 is connected to the input/output terminal 15 to input/output image information from/to an external device.

The control circuit 12 comprises, as shown in FIG. 12, a sensor control circuit 12a, density sensor control circuit 12b, filter sensor control circuit 12c, motor control circuit 12d, filter motor control circuit 12e, image information processing circuit 12f, lamp control circuit 12g, line sensor control circuit 12h, film density detection circuit 12i, motor driving speed determination circuit 12j, and image information storage circuit 12k.

(Operation)

Figure 2A:
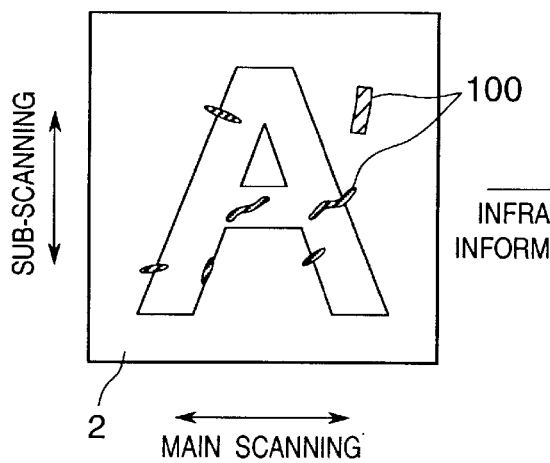
FIGS. 2A to 2D are views showing the concept of image reading with infrared light and visible light.
Figure 2B:
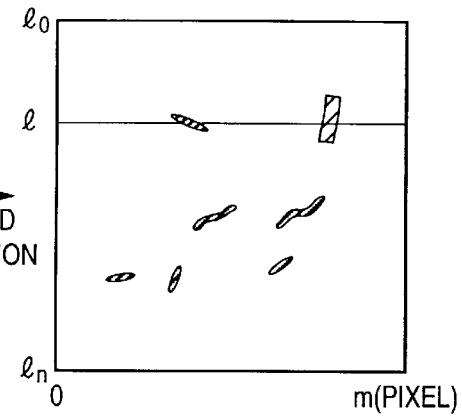
Figure 2C:
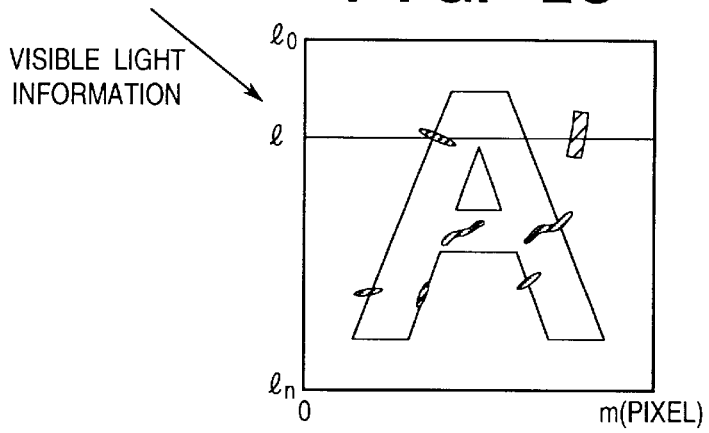

FIGS. 2A to 2D are views for explaining an example of an image read by vertically scanning (sub-scanning) the line sensor (read means) which is set with respect to the film 2 in the horizontal direction of the drawings. Assume that the film 2 has dust particles/flaws 100, as shown in FIG. 2A. Only the dust particles/flaws can be extracted using infrared light (invisible light) from the illumination system, as shown in FIG. 2B. When the image is read by illuminating the film with visible light, an image shown in FIG. 2C is obtained.

Figure 2D:
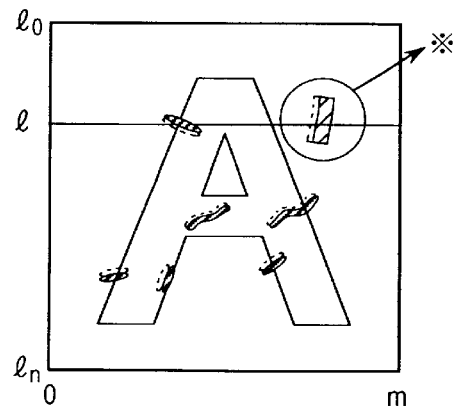

The dust particle/flaw region of the image shown in FIG. 2B is determined, and the image is superposed on the visible light image. As described above, when the scanning mechanism has a play, the images are not aligned, as shown in FIG. 2D. That is, the dust particle/flaw region read from the visible light image and that detected using infrared light do not match. FIGS. 3A to 3C show details of this state.

FIG. 3A is an enlarged view of data of one dust particle (*) shown in FIG. 2D, ranging from a pixel $m_1$ to a pixel $m_2$. The dotted line indicates a region determined as a dust particle or flaw from the infrared light image. The solid line indicates a dust particle/flaw region of the visible light image. Whether the visible light image data is dust particle or flaw data is determined by determining whether the image data is smaller than a certain threshold value and whether the rate of change of the image data is large at the boundary of the region. FIG. 3B shows the image data of a line l. As in FIG. 3A, the dotted line indicates the infrared data, and the solid line indicates the visible light data. The image data are not aligned, as shown in FIG. 3B, because of the shift between the dust particle/flaw detection regions.

The first embodiment corrects the data shown in FIG. 3B to data shown in FIG. 3C, in respect of all scan line of the film, to align the dust particle/flaw detection regions. This can be realized by observing the visible light image data and infrared image data and aligning the trailing- and leading-edge pixels of one data with those of the other data on each scan line.

A method of reading the image of the film 2 in the first embodiment will be described below with reference to the flow chart in FIG. 1.

This image reading method is stored in a storage area in the film scanner control circuit 12 (detection means, comparison means) as a program. This program may be input and controlled from an external device. Any storage form such as a floppy disk, CD-ROM, or MO can be employed.

(Step S1) When a film read instruction is input from the outside through the input/output terminal 15, the position of the film carriage 1 is detected by the sensor 8 and sensor control circuit 12a. This information is transmitted to the film scanner control circuit 12. To move the film carriage 1 to a predetermined stand-by position, the motor control circuit 12d drives the motor 7 to move the film carriage 1 to the stand-by position.

(Step S2) The filter sensor 17 and filter sensor control circuit 12c detect the position of the filter 10. This information is transmitted to the film scanner control circuit 12. To set the infrared filter 10a on the optical axis 9, the filter motor control circuit 12e drives the filter motor 11 to move the infrared filter 10a onto the optical axis 9.

(Step S3) The density sensor 16 and film density detection circuit 12i detect the density of the film 2.

(Step S4) The motor driving speed is determined on the basis of the detected film density.

(Step S5) The filter sensor 17 and filter sensor control circuit 12c detect the position of the filter 10. This information is transmitted to the film scanner control circuit 12. To set the density sensor control circuit 12b on the optical axis 9, the filter motor control circuit 12e drives the filter motor 11 to move the visible light filter 10b onto the optical axis 9.

(Step S6) The lamp control circuit 12g turns on the lamp 3.

(Step S7) The motor control circuit 12d rotates the motor 7 in a predetermined direction at the speed determined in advance to scan the image information of the film 2 using infrared light to read the image. During scanning, the image information is transmitted from the line sensor 6 to the image information processing circuit 12f through the line sensor control circuit 12h.

(Step S8) The image information processing circuit 12f (determination means) uses the obtained image information to determine any region on the film 2, where the infrared transmittance is different from that in most regions on the film 2 by a predetermined value or more. The image information processing circuit 12f prepares dust particle or flaw range information from the detected region.

(Step S9) The filter sensor 17 and filter sensor control circuit 12c detect the position of the filter 10. The filter motor control circuit 12e drives the filter motor 11 to move the infrared filter 10a onto the optical axis 9.

(Step S10) The motor control circuit 12d rotates the motor 7 in the reverse direction at the driving speed determined in step S4 to scan the image information of the film 2 using visible light. During scanning, the image information is transmitted from the line sensor 6 to the image information processing circuit 12f through the line sensor control circuit 12h.

(Step S11) When the scanning operation ends, the lamp control circuit 12g turns off the lamp 3. The dust particle or flaw range information is transmitted from the image information storage circuit 12k to the image information processing circuit 12f (region detection means, correction means). The image information of the film 2, which is obtained using visible light, is output. The film image read operation of the film scanner is complete.

(Step S12) An L counter is reset. A value of the L counter indicates the line number in the sub-scanning direction.

(Step S13) It is determined whether or not the value of the L counter is $l_n$ (a line number of the bottom of the film). If NO in step S13, the flow advances to step S14; otherwise, the flow branches to step S17.

(Step S14) For a line corresponding to the L counter in the sub-scanning direction of the image data, the visible light image data near the dust particle/flaw region specified in step S8 is looked up. Any shift between a pixel with a large luminance change in the infrared image data and that in the visible light image data is detected. To do this, it is determined whether the image data is smaller than a certain threshold value, i.e., whether the image data is sufficiently dark, as shown in FIG. 3B, and the shift between the trailing-edge pixels and that between the leading-edge pixels are compared. Referring to FIG. 3B, in the infrared image data, the trailing-edge pixel corresponds to a pixel $m_3$ and the leading-edge pixel corresponds to a pixel $m_5$. In the visible light image data, the trailing-edge pixel corresponds to a pixel $m_4$ and the leading-edge pixel corresponds to a pixel $m_6$. Hence, in step S14, any shift between the pixels $m_3$ and $m_4$ and that between the pixels $m_5$ and $m_6$ are determined. If these shifts are present, the flow advances to step S15; otherwise, the flow branches to step S16.

(Step S15) The leading-edge pixel of the infrared image data is aligned with that of the visible light image data. The trailing-edge pixel of the infrared image data is aligned with that of the visible light image data.

(Step S16) The L counter is incremented by one.

When processing in steps S13 to S16 is executed $l_n$ times in correspondence with the number of lines of the film in the sub-scanning direction, any shift between image data can be examined and corrected in their entire regions.

(Step S17) A dust particle/flaw region is determined on the basis of the infrared image data corrected in step S15.

(Step S18) The data of the new dust particle/flaw region determined in step S17 is corrected by a well-known method.

(Step S19) Image data whose dust particles and flaws are corrected is output.

With the above arrangement and flow, even when the infrared image and visible light image are shifted, the dust particle/flaw region can be accurately specified, and image data whose dust particles or flaws are satisfactorily corrected can be obtained.

<Second Embodiment>

In the first embodiment, when infrared image data and visible light image data are shifted, as shown in FIG. 2D, the infrared image data is aligned with the visible light image data to correct the dust particle/flaw region. In the second embodiment, when images have a shift, the dust particle/flaw region is corrected in a direction in which the region expands.

The second embodiment of the present invention will be described with reference to FIGS. 4 to 6D. The image reading apparatus of the second embodiment is assumed to be the film scanner described in the first embodiment with reference to FIGS. 10 to 12. The arrangement is the same as described above.

Figure 4:
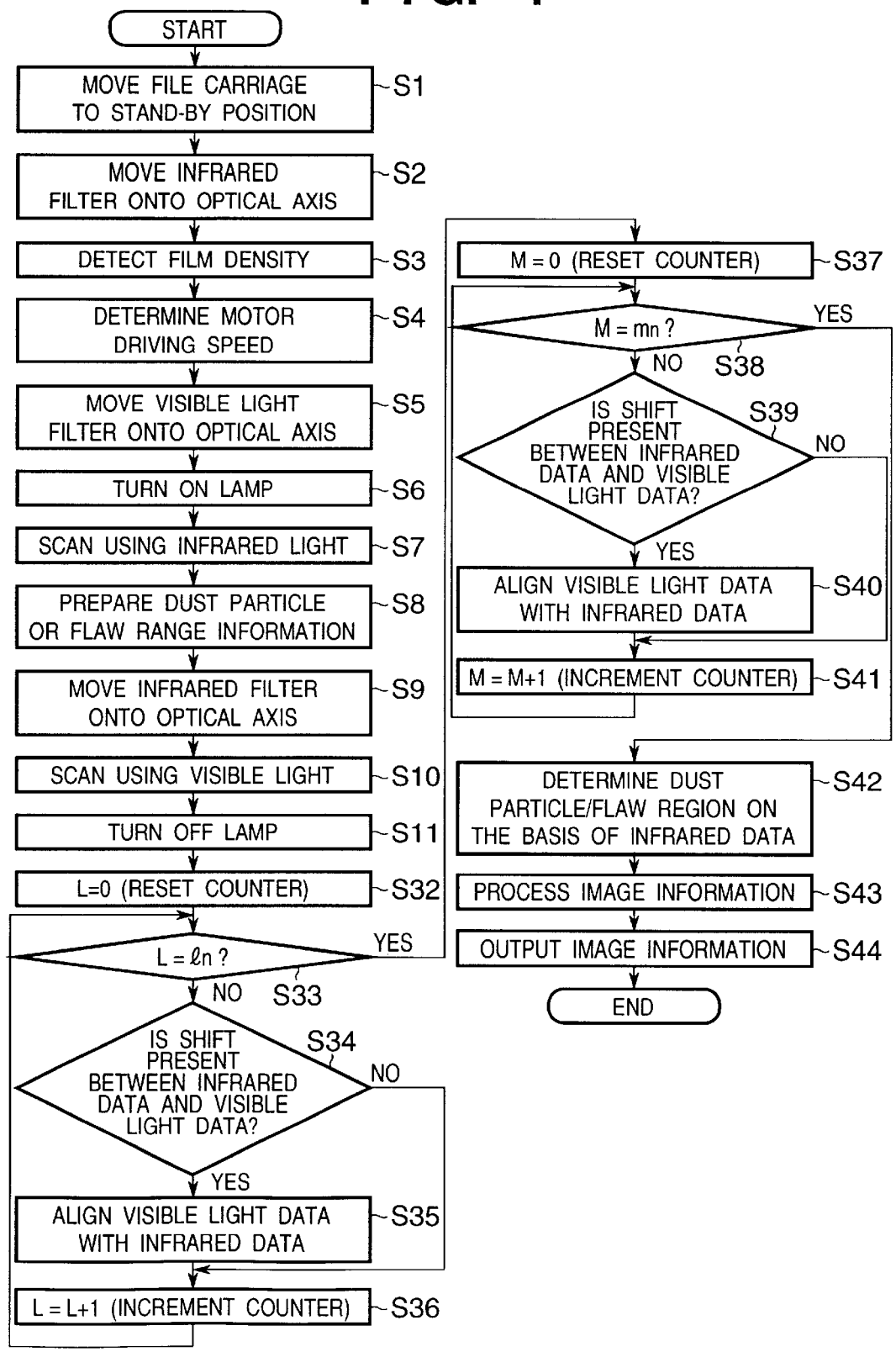
FIG. 4 is a flow chart for explaining the operation of a film scanner according to the second embodiment.

FIG. 4 is a flow chart for explaining the operation of the film scanner according to the second embodiment. FIGS. 5A to 5C and 6A to 6D are views showing correction of a dust particle/flaw region.

Figure 5A:
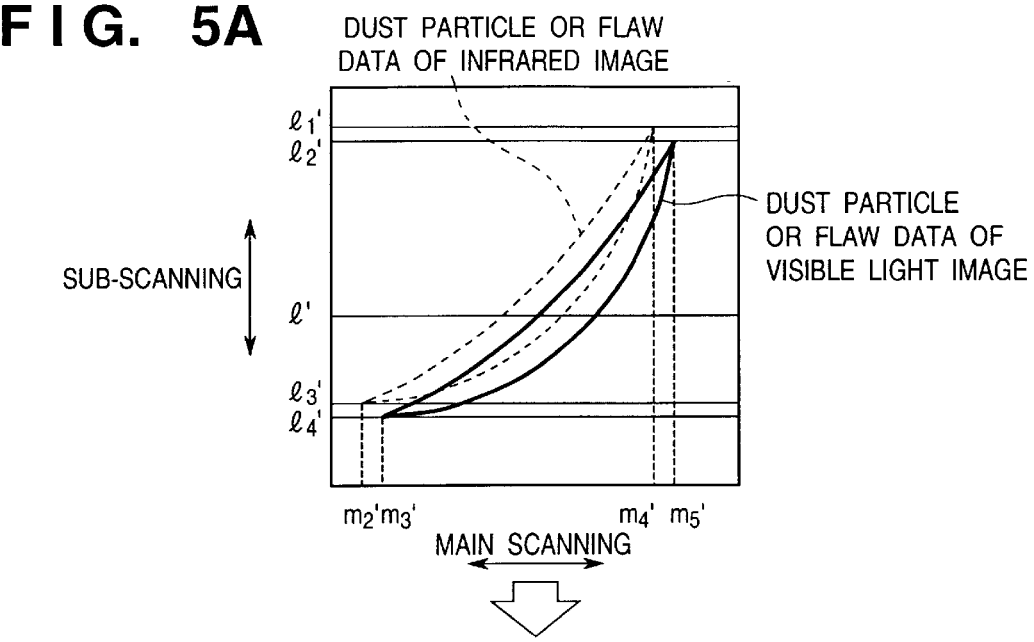
FIGS. 5A to 5C are views for explaining an image data aligning method according to the second embodiment.

FIG. 5A shows a shift between an infrared image and a visible light image, as in FIG. 3A. In FIG. 3A, a shift is present only in the horizontal direction. However, in FIG. 5A, the images also have a shift in the vertical direction.

In the visible light image, a crescent dust particle is present within the range of $l_4'm_3'$ to $l_2'm_5'$. In the infrared image, a dust particle is present within the range of $l_3'm_2'$ to $l_1'm_4'$. That is, the images shift by an amount corresponding to the distance between these pixels. FIG. 6A shows the image information of a line almost in the middle of the images shown in FIG. 5A. Referring to FIG. 6A, the infrared image data and visible light image data are shifted, as in FIG. 3B. (As described in the first embodiment, whether the visible light image data is dust particle or flaw data is determined by determining whether the image data is smaller than a certain threshold value).

In the second embodiment, to correct this shift, the dust particle or flaw data is corrected in a direction in which the dust particle or flaw expands. FIG. 6B shows this expansion. The leading-edge pixel of the infrared image data is corrected from $m_5$ to $m_6$. This correction is performed in the dust particle/flaw region ($l_1'$ to $l_3'$) of the infrared image.

Figure 5B:
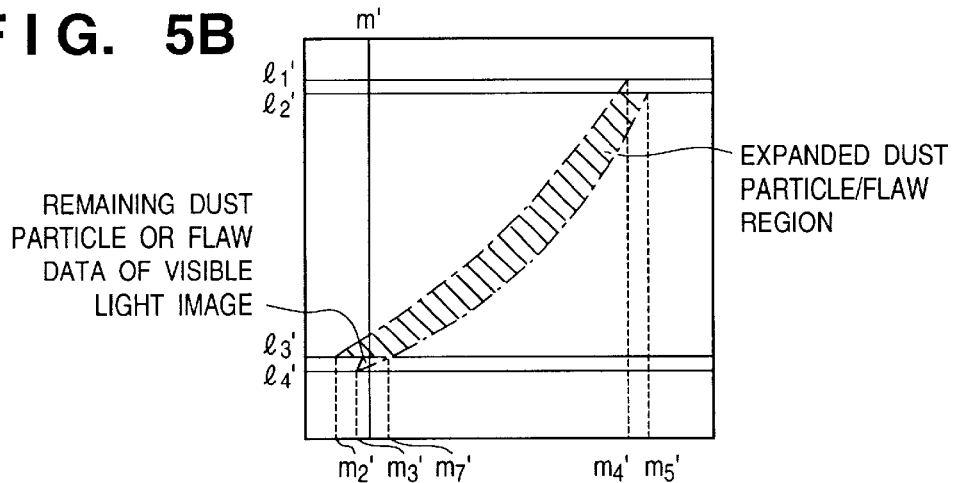
Figure 5C:
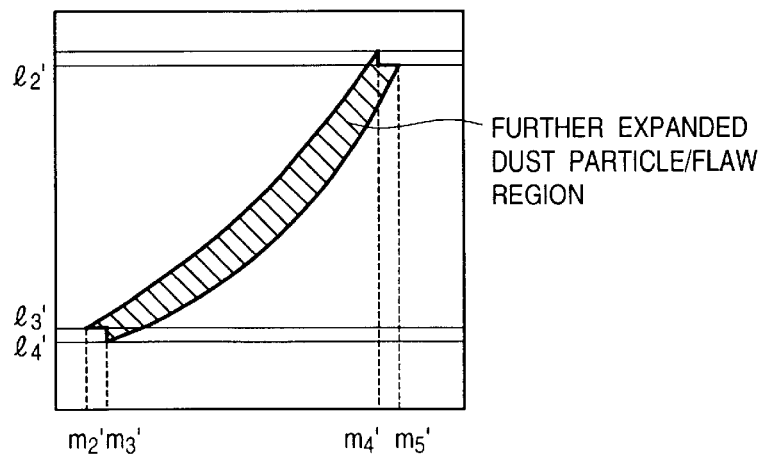

A dust particle/flaw region shown in FIG. 5B is newly obtained. The region in the sub-scanning direction, $l_1'$ to $l_3'$ in FIG. 5A, can be corrected by the above method to correct the dust particle/flaw region including the dust particle or flaw of the visible light image. However, the dust particle data of the visible light image remains in the region from $l_3'$ to $l_4'$. The image is sliced in the vertical direction, and the same processing as described above is performed. With this processing, a dust particle/flaw region completely including the dust particle data of the visible light image can be specified. FIGS. 6C and 6D show this state. As shown in FIGS. 6C and 6D, the leading-edge pixel of the infrared image data is aligned with that of the visible light image data. This correction is performed in the dust particle/flaw region ($m_2'$ to $m_4'$) of the infrared image to correct the dust particle/flaw region. With this processing, a dust particle/flaw region completely including the dust particle data of the visible light image can be prepared (FIG. 5C).

A method of reading the image of a film 2 in the second embodiment will be described below with reference to the flow chart in FIG. 4. This image reading method is stored in a storage area in a film scanner control circuit 12 as a program. This program may be input and controlled from an external device. Any storage form such as a floppy disk, CD-ROM, or MO can be employed.

Processing in steps S1 to S11 is the same as in steps S1 to S11 in the first embodiment. With this processing, infrared and visible light image data are stored, and the illumination lamp is turned off.

(step S32) The L counter is reset.

(step S33) It is determined whether the value of the L counter is $l_n$. If NO in step S33, the flow advances to step S34; otherwise, the flow branches to step S37.

(Step S34) For a line corresponding to the L counter in the sub-scanning direction of the image data, the visible light image data near the dust particle/flaw region specified in step S8 is looked up. Any shift between a pixel with a large luminance change in the infrared image data and that in the visible light image data is detected. To do this, it is determined whether the image data are smaller than a certain threshold value, i.e., whether the image data are sufficiently dark, as shown in FIG. 6B, and the shift between the trailing-edge pixels and that between the leading-edge pixels are compared. Referring to FIG. 6B, in the infrared image data, the trailing-edge pixel corresponds to a pixel $m_3$ and the leading-edge pixel corresponds to a pixel $m_5$. In the visible light image data, the trailing-edge pixel corresponds to a pixel $m_4$ and the leading-edge pixel corresponds to a pixel $m_6$. Hence, in step S34, any shift between the pixels $m_3$ and $m_4$ and that between the pixels $m_5$ and $m_6$ are detected. If these shifts are present, the flow advances to step S35; otherwise, the flow branches to step S36.

(Step S35) The leading-edge pixel of the infrared image data is aligned with that of the visible light image data.

(Step S36) The L counter is incremented by one.

When processing in steps S33 to S36 is executed $l_n$ times in correspondence with the number of steps in the sub-scanning direction, any main-scanning shift between image data can be examined and corrected in their entire regions.

(step S37) The M counter is reset. A value of the M counter indicates the line number in the main-scanning direction.

(step S38) It is determined whether or not the value of the M counter is $m_n$ (a line number of the right end of the film) If NO in step S38, the flow advances to step S39; otherwise, the flow branches to step S42.

(Step S39) For a line corresponding to the M counter in the sub-scanning direction of the image data, the visible light image data near the dust particle/flaw region specified in step S8 is looked up. Any shift between a pixel with a large luminance change in the infrared image data and that in the visible light image data is detected. To do this, it is determined whether the image data is smaller than a certain threshold value, i.e., whether the image data is sufficiently dark, as shown in FIG. 6C, and the shift between the trailing-edge lines and that between the leading-edge lines are compared. Referring to FIG. 6C, in the infrared image data, the trailing-edge line does not match that of the visible light image data, and the leading-edge lines of the two images do not match, also. In step S39, these shifts are detected. If one of these shifts is present, the flow advances to step S40; otherwise, the flow branches to step S41.

(Step S40) The leading-edge pixel of the infrared image data is aligned with that of the visible light image data.

(Step S41) The M counter is incremented by one.

When processing in steps S38 to S41 is executed $m_n$ times in correspondence with the number of pixels in the main scanning direction, any sub-scanning shift between image data can be examined and corrected in their entire regions.

(Step S42) A dust particle/flaw region is determined on the basis of the infrared image data corrected in step S40.

(Step S43) The data of the new dust particle/flaw region determined in step S42 is corrected by a well-known method.

(Step S44) Image data whose dust particles and flaws are corrected is output.

With the above arrangement and flow, even when the infrared image and visible light image have shifted, the dust particle/flaw region can be accurately specified, and image data whose dust particles or flaws are satisfactorily corrected can be obtained.

<Third Embodiment>

In the first embodiment, when infrared image data and visible light image data have shifted, as shown in FIG. 2D, the infrared image data is aligned with the visible light image data to correct the dust particle/flaw region. In the second embodiment, the dust particle/flaw region is corrected in a direction in which the region expands. In the third embodiment, the region is corrected more simply than the first and second embodiments to shorten the calculation time.

The third embodiment of the present invention will be described with reference to FIGS. 7 to 9B. The image reading apparatus of the third embodiment is assumed to be the film scanner described in the first embodiment reference to FIGS. 10 to 12. The arrangement is the same as described above.

Figure 7:
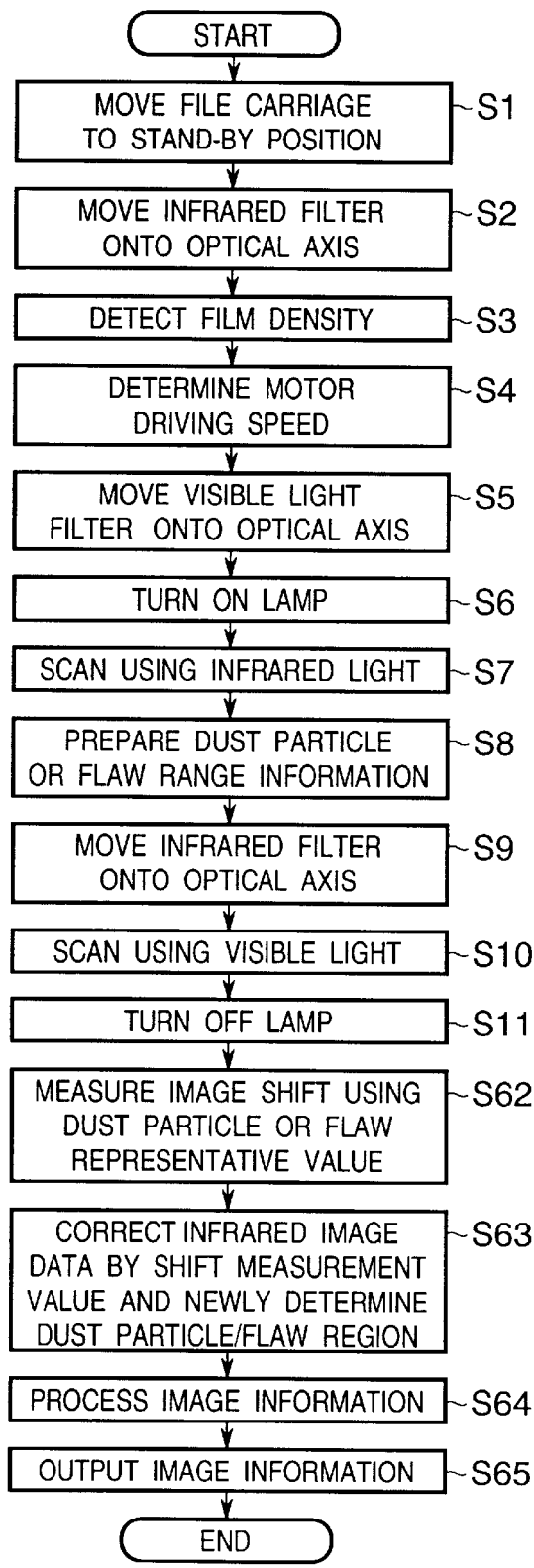
FIG. 7 is a flow chart for explaining the operation of a film scanner according to the third embodiment.

FIG. 7 is a flow chart for explaining the operation of the film scanner according to the third embodiment. FIGS. 8A and 8B and 9A and 9B are views showing correction of a dust particle/flaw region.

Figure 8A:
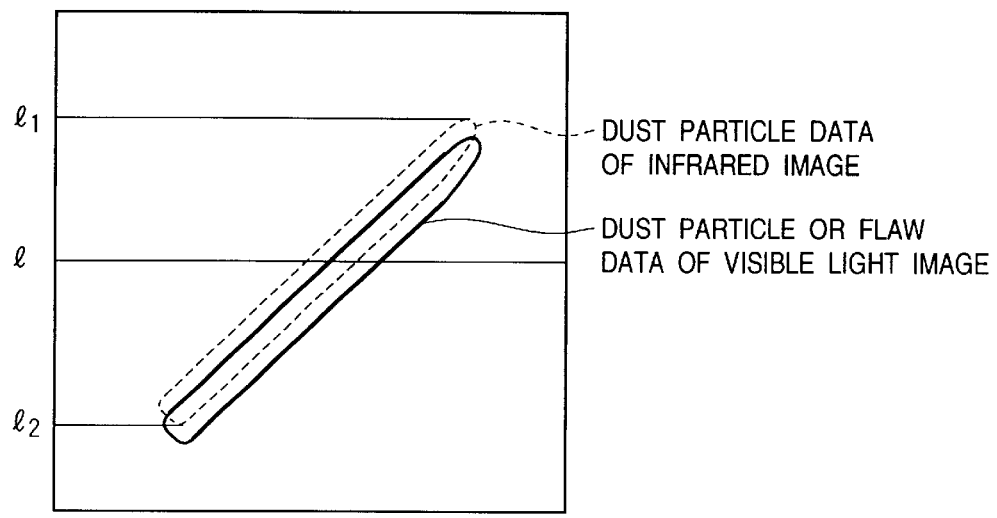
FIGS. 8A and 8B are views for explaining an image data aligning method according to the third embodiment.

FIG. 8A shows a shift between an infrared image and a visible light image, as in FIG. 5A. A rod-shaped dust particle or flaw obliquely has shifted to the upper left side. As described above, if this shift has occurred due to play of the scanning mechanism, the shift is uniform in the entire image. The shift amount rarely changes in units of scan lines. For this reason, when the shift of a certain line of an image is measured, and the infrared image data is moved by the shift amount, the shift is mostly correctable. The third embodiment exemplifies this.

Figure 8B:
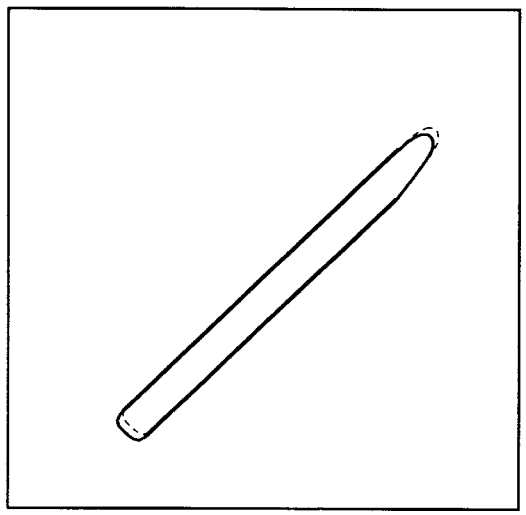
Figure 9B:
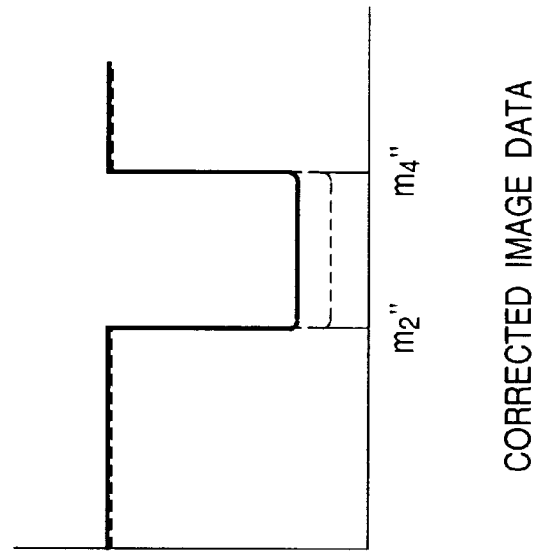
FIGS. 9A and 9B are graphs for explaining the image data aligning method according to the third embodiment.
Figure 9A:
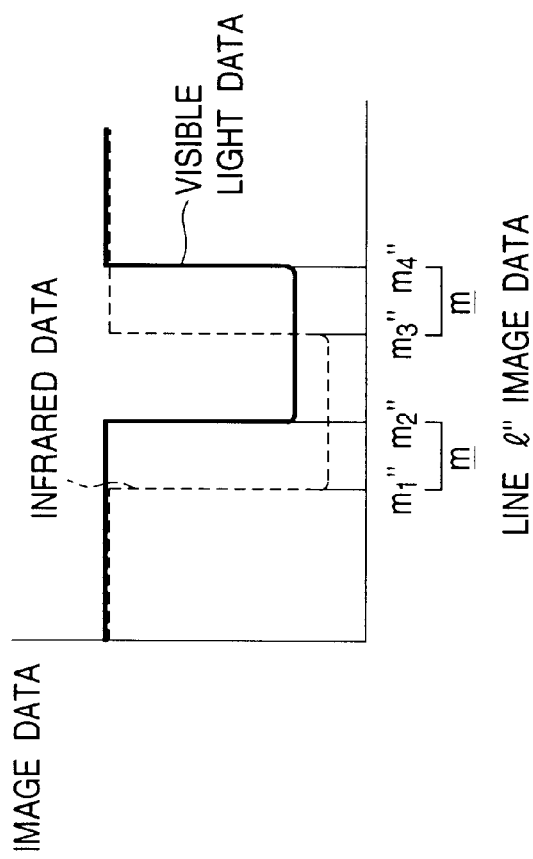

FIG. 8A is an enlarged view of one dust particle in the image. The dust particle data of the infrared image is present within the range of $l_1"$ to $l_2"$ in the sub-scanning direction. FIG. 9A shows the data of a line (l") almost in the middle between the lines $l_1"$ and $L_2"$. Data $(m_2"-m_1")$ or $(m_4"-m_3")$ in this data is shift data. Let $m = m_2" - m_1" = m_4" - m_3"$, and the infrared image data is shifted by only the amount m to correct the data (FIG. 9B). This correction is performed for the entire image data to correct the infrared image data (FIG. 8B). With this processing, the dust particle/flaw region in which the dust particle data of the infrared image almost matches that of the visible light image can be prepared.

A method of reading the image of a film 2 in the third embodiment will be described below with reference to the flow chart in FIG. 7. This image reading method is stored in a storage area in a film scanner control circuit 12 as a program. This program may be input and controlled from an external device. Any storage form such as a floppy disk, CD-ROM, or MO can be employed.

Processing in steps S1 to S11 is the same as in steps S1 to S11 shown in FIG. 1. With this processing, infrared and visible light image data are stored, and the illumination lamp is turned off.

(Step S62) Representative data is arbitrarily selected from the dust particle/flaw region prepared in step S8, and the shift amount is obtained by the above-described shift measuring method.

(Step S63) The infrared image data is corrected by the shift amount obtained in step S62. A new dust particle/flaw region is prepared on the basis of the corrected infrared image data.

(Step S64) The new dust particle/flaw region data prepared in step S63 is corrected by a known method.

(Step S65) The image data whose dust particles and flaws are corrected is output.

With the above arrangement and flow, even when the infrared image and visible light image have shifted, the dust particle/flaw region can be accurately specified, and image data whose dust particles or flaws are satisfactorily corrected can be obtained by the simple method.

As described above, according to the first to third embodiment, the first region that satisfies a predetermined condition in the first image information obtained by irradiating the original image with invisible light is compared with the second region that satisfies a predetermined condition in the second image information obtained by irradiating the original image with visible light. A high-quality read image can be obtained in accordance with the comparison result.

<Fourth Embodiment>

The fourth embodiment of the present invention will be described next.

As a prior art of the fourth embodiment of the present invention, Japanese Patent Publication No. 7-97402 discloses a method of correcting original image data by replacing a pixel recognized as a dust particle or flaw with appropriately selected peripheral image information.

Japanese Patent No. 2,559,970 discloses an example of the correction technique. In this technique, when the infrared energy distribution intensity in a region recognized as a dust particle/flaw region is larger than a predetermined threshold value, the visible light energy distribution intensity is increased to a level at which the infrared energy distribution intensity is canceled. When the detected infrared energy distribution intensity is equal to or smaller than the predetermined threshold value, the visible light energy distribution intensity is corrected by interpolation.

However, the above-described conventional film scanner has the following problems. In the method of appropriately selecting peripheral pixel data, which is disclosed in Japanese Patent Publication No. 7-97402, missed defective pixels are compensated for with peripheral pixels. For this reason, complete correction data is difficult to form, and image data cannot be completely corrected.

In the method of correcting image data on the basis of infrared image data in the dust particle/flaw region, which is disclosed in Japanese Patent No. 2,559,970, when the detected infrared image data and the visible light image data to be corrected have shifted, the correction result may become unnatural.

As the fourth embodiment of the present invention, a film scanner using original image information faintly remaining in the dust particle/flaw region on a film will be used with reference to FIGS. 14 to 16B.

Figure 14:
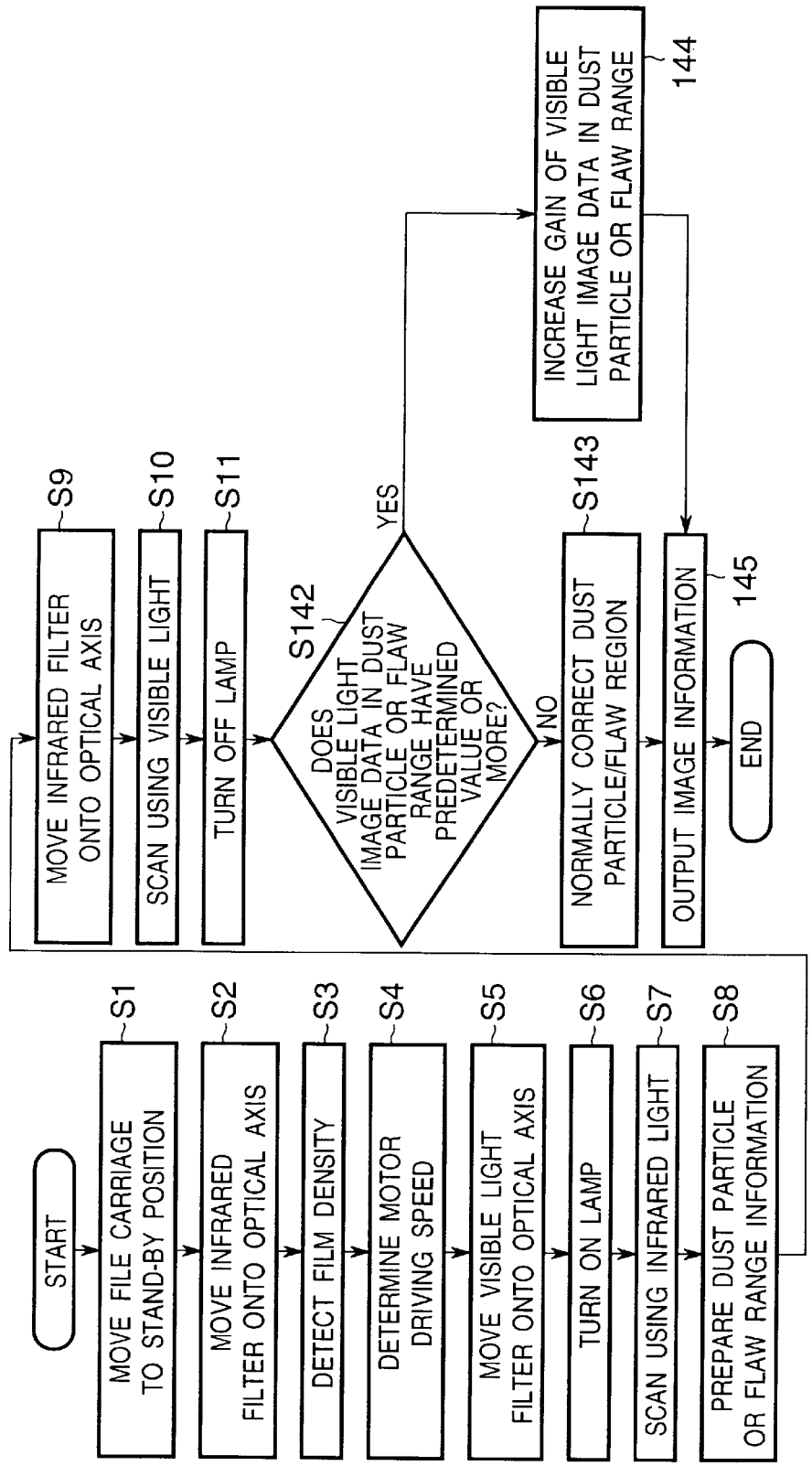
FIG. 14 is a flow chart for explaining the operation of a film scanner according to the fourth embodiment of the present invention.

FIG. 14 is a flow chart showing the operation of the film scanner according to the fourth embodiment. FIGS. 15A to 15E are views showing image data read using infrared illumination and image data read by visible light illumination. FIGS. 16A and 16B show examples of one line image data read by visible light and infrared light.

Figure 15A:
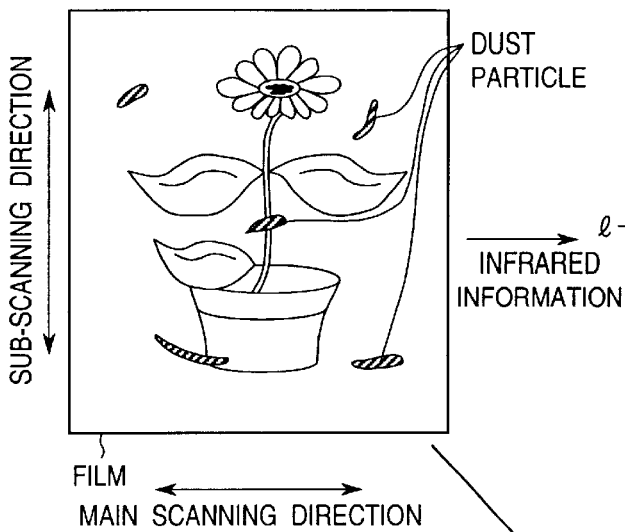
FIGS. 15A to 15E are views showing the concept of image reading with infrared light and visible light.
Figure 15B:
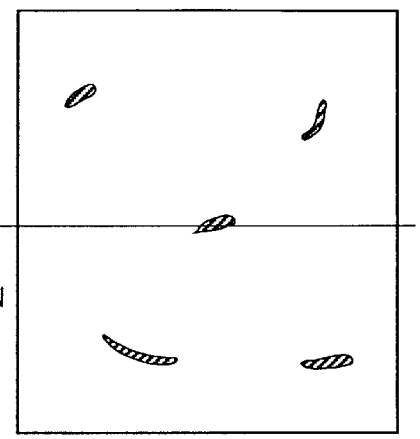

FIG. 15A shows the image of a film 2. A line sensor is set in the horizontal direction of the drawing, and it is scanned in the vertical direction (sub-scanning direction) to read an image. When the film has a dust particle or flaw, as shown in FIG. 15A, only the dust particle or flaw is extracted by reading the image using infrared light for the illumination system, as shown in FIG. 15B. When the image is read using visible light, an image shown in FIG. 15C is obtained.

Figure 15C:
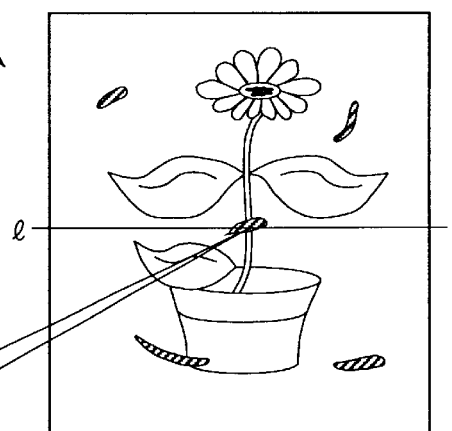
Figure 15D:
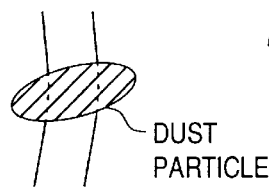
Figure 15E:
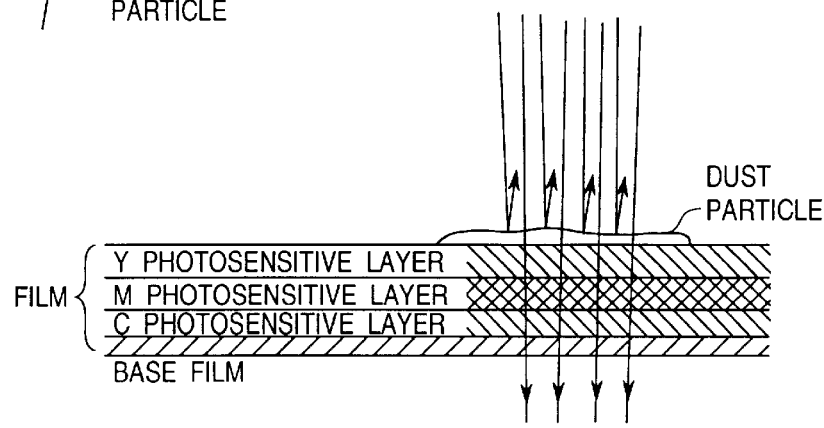
Figure 16A:
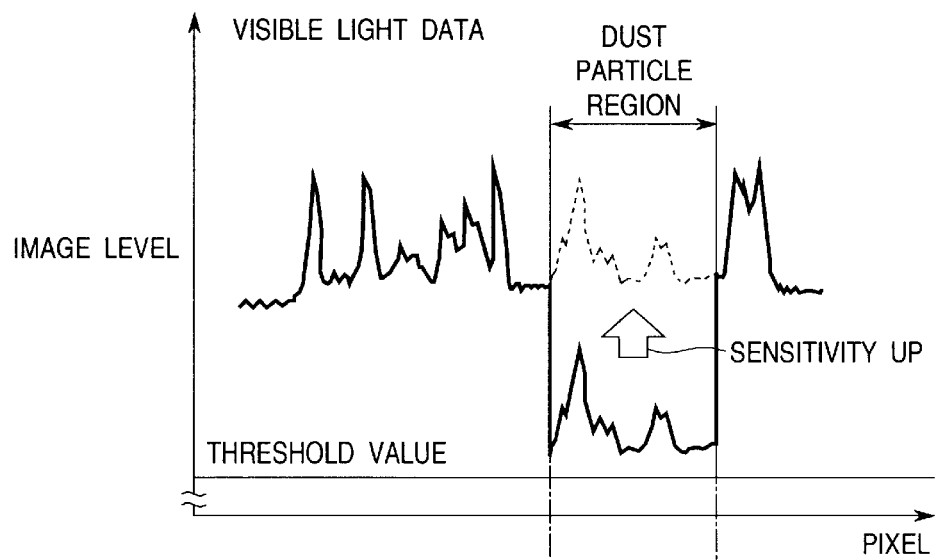
FIGS. 16A and 16B are graphs for explaining an image data aligning method.
Figure 16B:
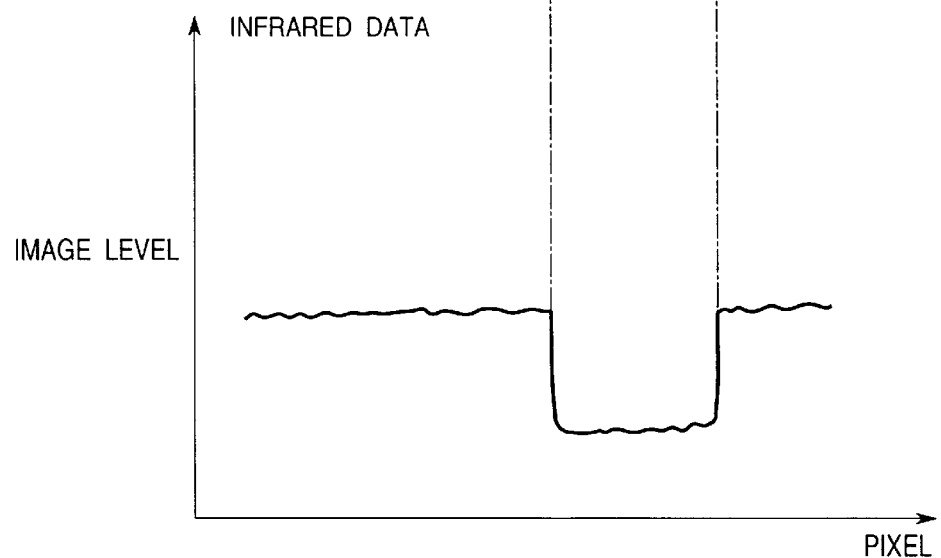

FIG. 15D is an enlarged view of part of FIG. 15C. If the dust particle is semi-transparent, the dust particle region is not completely dark, and the image pattern remains faintly. FIG. 15E schematically shows this. FIG. 15E shows a state wherein a dust particle on a general film shields light (visible light). If light passes through the film even slightly, the light reaches the CCD via the photosensitive layers of the film and is output as image data. Since the output value is small, a faint image pattern remains in the dust particle region, as shown in FIG. 15D.

FIGS. 16A and 16B show image data near the dust particle/flaw region. FIGS. 16A and 16B show visible light (any one of R, G, and B) and infrared image information of the lth line (arbitrary line in the dust particle/flaw region) in the sub-scanning direction shown in FIGS. 15B and 15C. The ordinate represents the image data level. The higher the image data level, the higher the luminance. The lower the image data level, the lower the luminance. Hence, when the light is shielded by a dust particle, the image level becomes low. The shielded state is known from the image data level at that time. A region where infrared image data level is lower than a predetermined level, which is shown in FIG. 16B, is specified as a dust particle/flaw region. That region in the visible light image data, which corresponds to this region, is corrected.

FIG. 16A shows a state wherein some image data remains in the dust particle/flaw region. This state is determined on the basis of whether the image data is larger than a predetermined value. In accordance with the determination result, the image data can be corrected by adding a predetermined quantity of image data or multiplying the image data by a predetermined constant to increase the image data gain to a level matching the peripheral image data.

A method of reading the image of the film 2 in the fourth embodiment will be described below with reference to the flow chart in FIG. 14. This image reading method is stored in a storage area in a film scanner control circuit 12 as a program. This program may be input and controlled from an external device. Any storage form such as a floppy disk, CD-ROM, or MO can be employed.

Processing in steps S1 to S11 is the same as in steps S1 to S11 in the first embodiment. With this processing, infrared and visible light image data are stored.

(Step S142) It is determined whether the visible light image data in the dust particle/flaw range prepared in step S8 is equal to or larger than a predetermined value. If NO in step S142, it is determined that no visible light image remains in the dust particle/flaw region, and the flow advances to step S143. If YES in step S142, it is determined that a visible light image remains in the dust particle/flaw region, and the flow branches to step S144.

(Step S143) An image information processing circuit 12f (correction means) corrects the dust particle/flaw region by a known method.

(Step S144) The image information processing circuit 12f (correction means) increases the data gain to a value matching the level of the image adjacent to the dust particle/flaw region.

(Step S145) The image data corrected in step S143 or S144 is output.

With the above arrangement and flow, even when a dust particle or flaw is present on the film, image data whose original image is faithfully corrected can be obtained.

<Fifth Embodiment>

In the fourth embodiment, an example wherein all components of visible light image data in a region determined as a dust particle or flaw have values equal to or larger than a predetermined value has been described. In the fifth embodiment, a method of correcting visible light image data when no visible light image data remains at all in a dust particle/flaw region and, more specifically, the data partially has a value equal to or smaller than a predetermined value or the light transmittance through a dust particle varies will be described. The arrangement of the apparatus is the same as in the fourth embodiment, and a detailed description thereof will be omitted.

The fifth embodiment of the present invention will be described with reference to FIGS. 17, 18A, and 18B.

Figure 17:
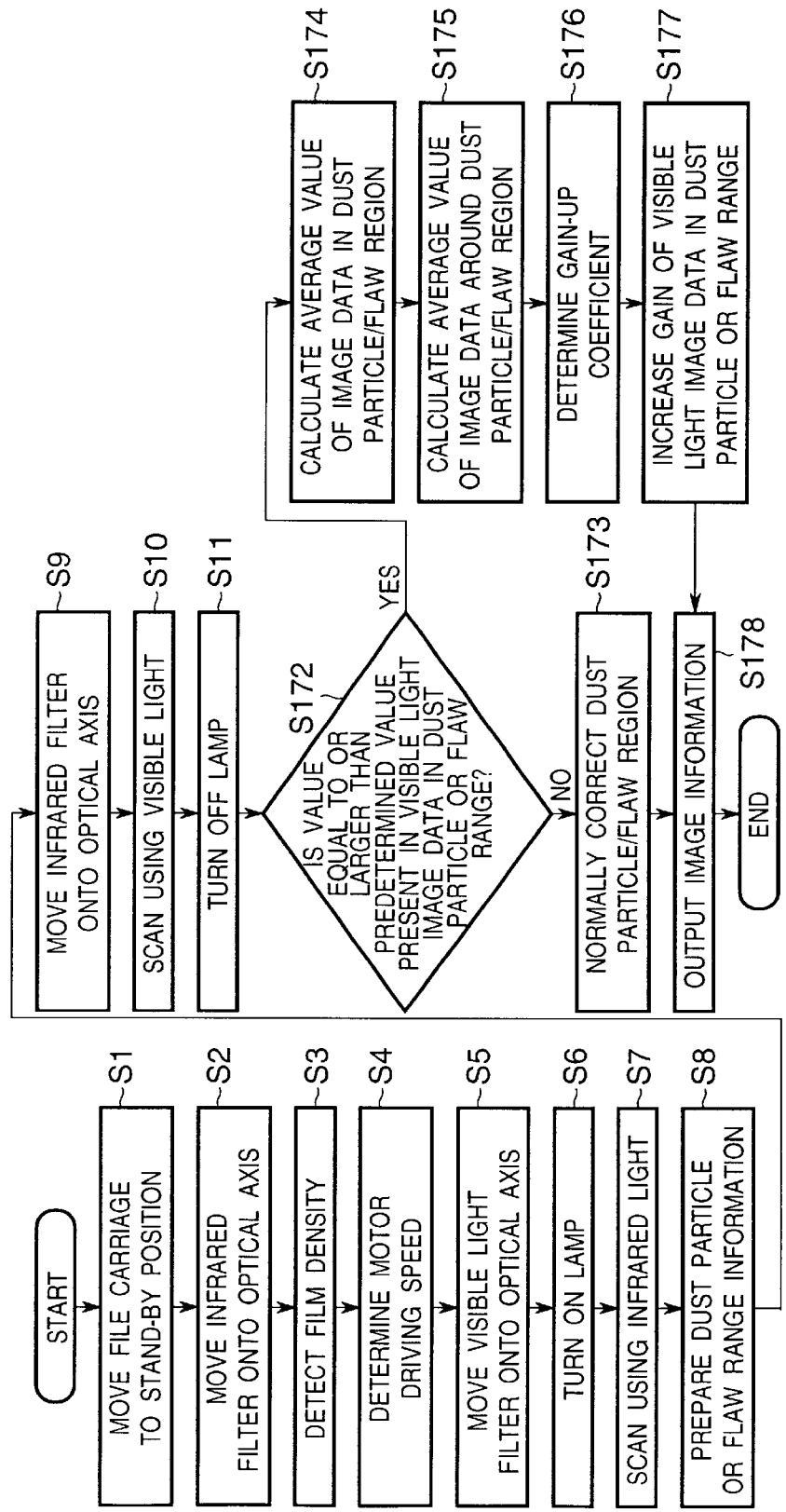
FIG. 17 is a flow chart for explaining the operation of a film scanner according to the fifth embodiment.

FIG. 17 is a flow chart showing the operation of a film scanner according to the fifth embodiment. FIGS. 18A and 18B show examples of one line image data obtained using visible light and infrared light in a dust particle/flaw region.

Image information used in this embodiment is the same as that shown in FIGS. 15A to 15E, and a detailed description thereof will be omitted.

Figure 18A:
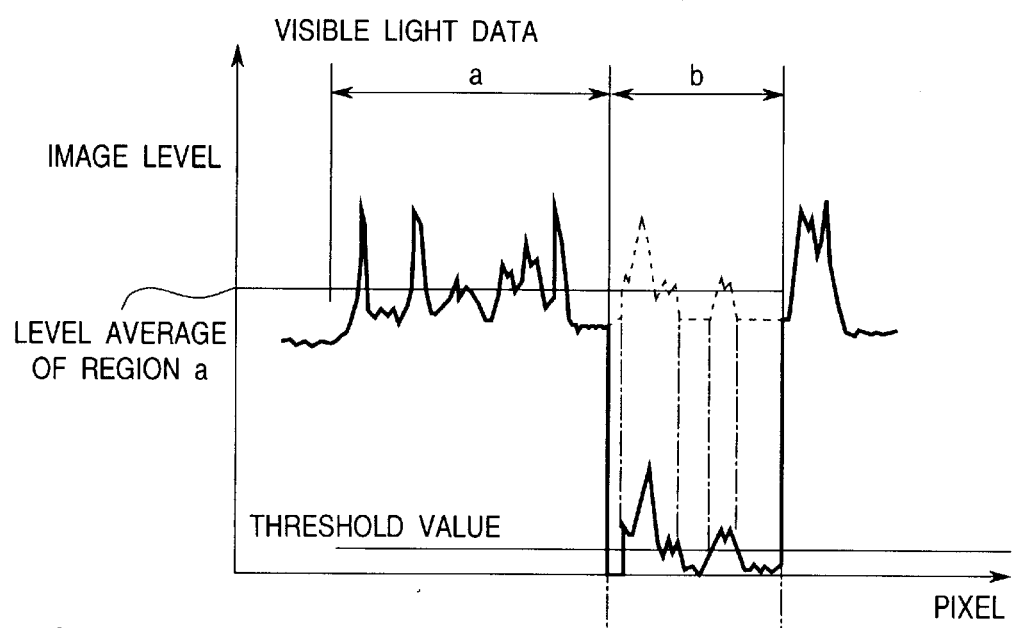
FIGS. 18A and 18B are graphs for explaining an image data correction method.
Figure 18B:
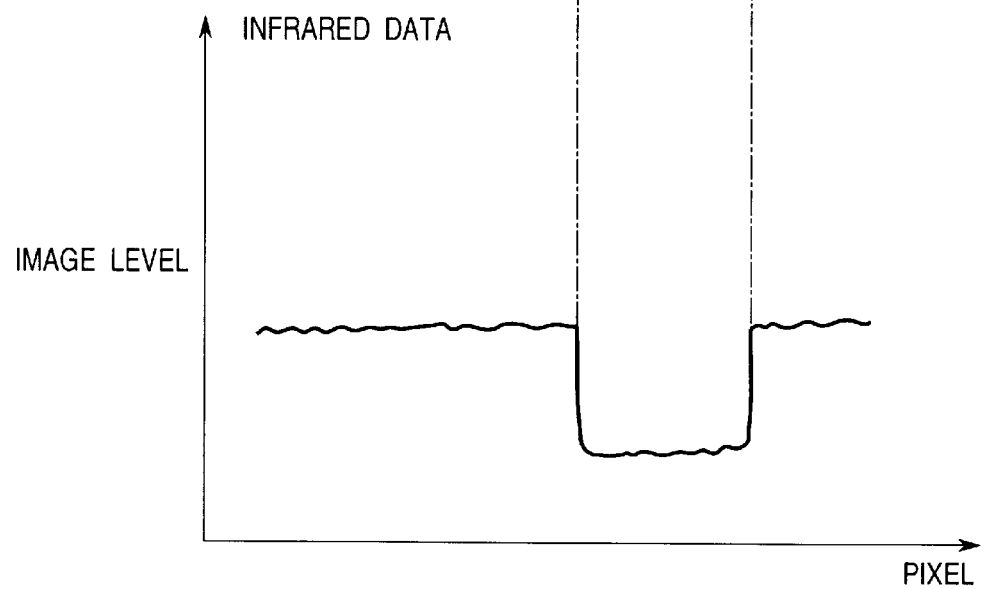

FIGS. 18A and 18B show image data near the dust particle/flaw region, like FIGS. 16A and 16B. FIGS. 18A and 18B show visible light (any one of R, G, and B) and infrared image information of the lth line (arbitrary line in the dust particle/flaw region) in the sub-scanning direction shown in FIGS. 15B and 15C. The ordinate represents the image data level. The higher the image data level, the higher the luminance. The lower the image data level, the lower the luminance. Hence, when the light is shielded by a dust particle, the image level becomes low. The shielded state is known from the image data level at that time. A region where infrared image data level is lower than a predetermined level, which is shown in FIG. 18B, is specified as a dust particle/flaw region. That region in the visible light image data, which corresponds to this region, is corrected.

FIG. 18A shows a state wherein some image data remains in the dust particle/flaw region. Unlike FIG. 16A, the original image of the visible light image is partially omitted because the dust transmittance has a variation or the remaining data is smaller than a threshold value and is hidden behind noise. In this case, the visible light image data in the dust particle/flaw region has both a portion larger than the threshold value and a portion smaller than the threshold value. The image can be corrected by increasing the image level gain. When image data at the boundary portion of the dust particle/flaw region is missing, as shown in FIG. 18A, the gain cannot be set by matching the image level with the level of peripheral image data, as described in the fourth embodiment. In the fifth embodiment, the image is corrected by adding a predetermined quantity of image data or multiplying the image data level by a predetermined constant such that the average value of image data in the dust particle/flaw region matches the average value in a certain range of the peripheral image data.

A method of reading the image of a film 2 in the fourth embodiment will be described below with reference to the flow chart in FIG. 17. This image reading method is stored in a storage area in a film scanner control circuit 12 as a program. This program may be input and controlled from an external device. Any storage form such as a floppy disk, CD-ROM, or MO can be employed.

Processing in steps S1 to S11 is the same as in steps S1 to S11 in the first embodiment. With this processing, infrared and visible light image data are stored.

(Step S172) It is determined whether the visible light image data in the dust particle/flaw range prepared in step S8 has data equal to or larger than a predetermined value. If NO in step S172, it is determined that no visible light image remains in the dust particle/flaw region, and the flow advances to step S173. If YES in step S172, it is determined that a visible light image remains in the dust particle/flaw region, and the flow branches to step S174.

(Step S173) An image information processing circuit 12f (correction means) corrects the dust particle/flaw region by a well-known method.

(Step S174) The average value of visible light image data in the dust particle/flaw region is calculated.

(Step S175) The average value of visible light image data around the dust particle/flaw region is calculated.

(Step S176) The gain-up coefficient is calculated on the basis of the average values calculated in steps S174 and S175.

(Step S177) The image information processing circuit 12f (correction means) increases the gain of the visible light image data in the dust particle/flaw region in accordance with the coefficient calculated in step S176.

(Step S178) The image data corrected in step S173 or S177 is output.

With the above arrangement and flow, even when a dust particle or flaw is present on the film, image data whose original image is faithfully corrected can be obtained.

<Sixth Embodiment>

As described at the beginning of the fourth embodiment, a dust particle or flaw correction technique is disclosed in Japanese Patent Publication No. 7-97402 or Japanese Patent No. 2,559,970.

In the above-described film scanner, however, the correction method is complex. The amount of correction calculation by arithmetic means is enormous, and a considerable time is required to obtain a corrected image.

As an image reading apparatus according to the sixth embodiment of the present invention, a film scanner capable of satisfactorily correcting a dust particle or flaw and obtaining a higher-quality film image in a shorter time will be described with reference to FIGS. 19 to 22D.

The film scanner of the sixth embodiment has the same arrangement as in the first embodiment described with reference to FIGS. 10 to 12, and a detailed description thereof will be omitted.

Figure 19:
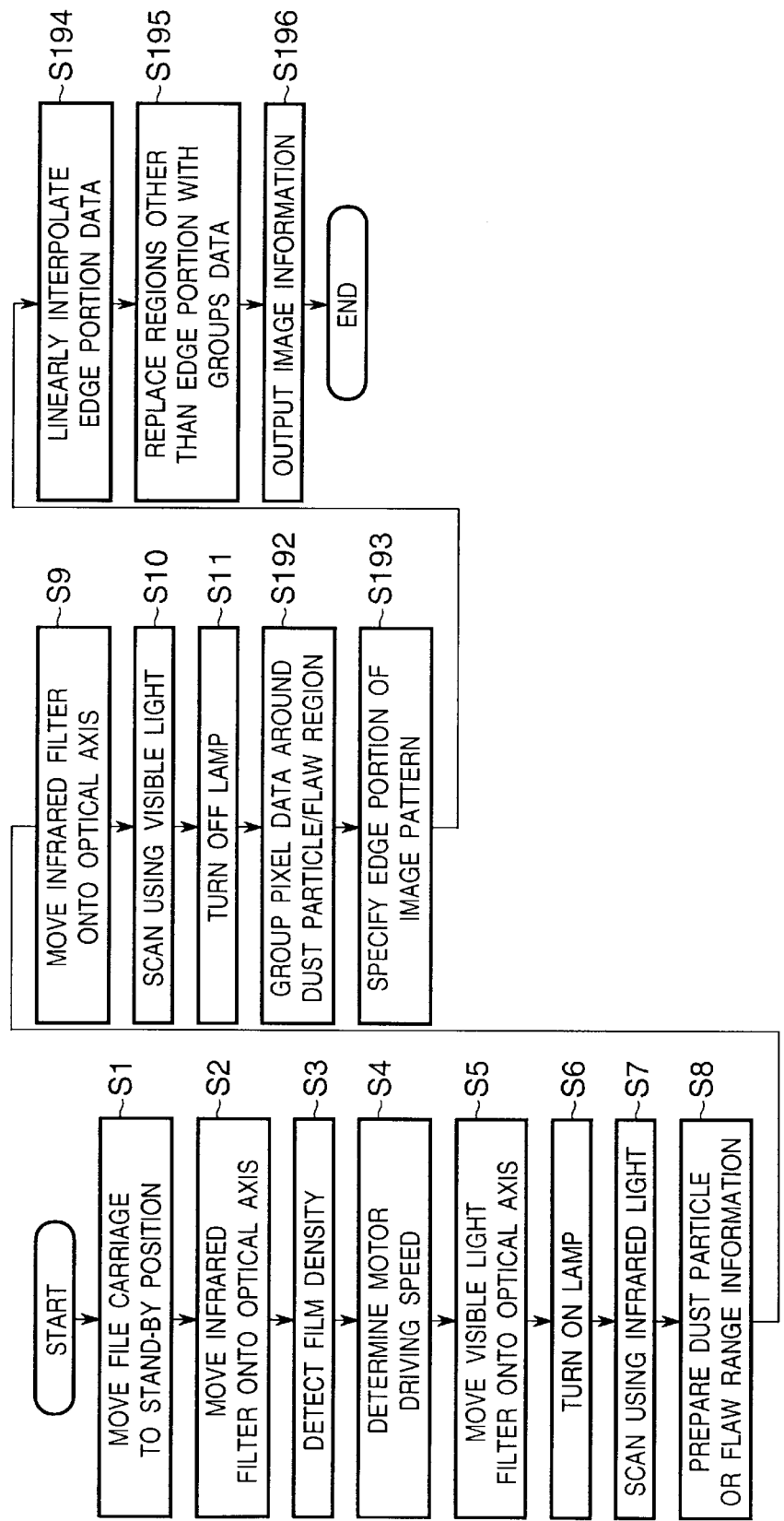
FIG. 19 is a flow chart for explaining the operation of a film scanner according to the sixth embodiment.
Figure 20A:
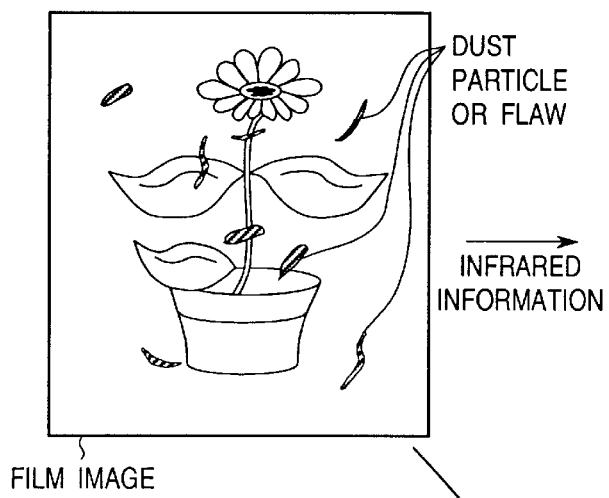
FIGS. 20A to 20C are views showing the concept of image reading with infrared light and visible light.
Figure 20B:
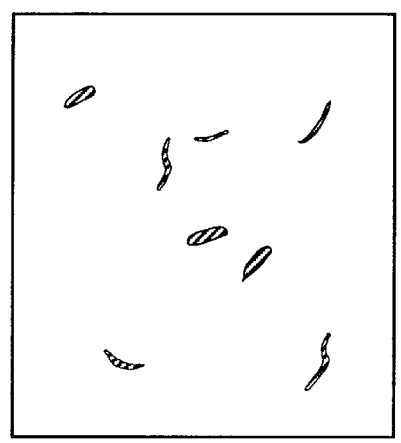
Figure 20C:
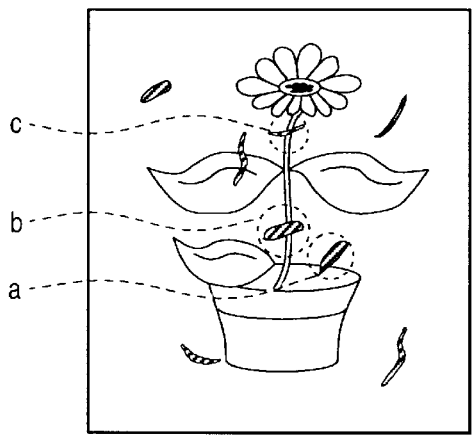
Figures 21A, 21B, 21C:
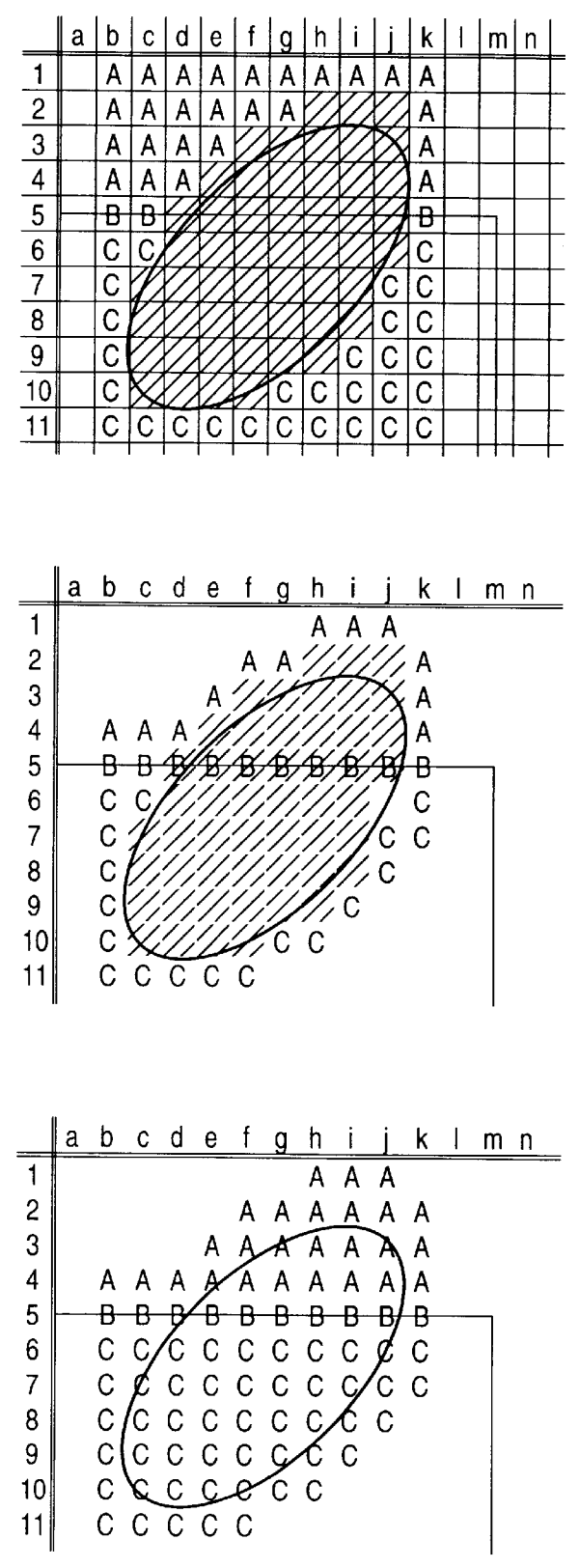

FIG. 19 is a flow chart showing the operation of the film scanner according to the sixth embodiment. FIGS. 20A to 20C show examples of image data obtained by reading a film image by infrared illumination and visible light illumination. FIGS. 21A to 21C are enlarged views showing a portion (a) of visible light image data shown in FIG. 20C and correction of that portion. As a basic processing flow, a dust particle/flaw region is detected on the basis of image data read using infrared light, as shown in FIG. 20B, and the visible light image data is corrected using information of the detected dust particle/flaw region. FIGS. 21A to 21C show how the correction is done. FIGS. 22A to 22D show image data (any one of R, G, and B) of vertical and horizontal lines around the dust particle/flaw region.

FIGS. 21A to 21C are enlarged views of the portion (a), i.e., the dust particle region at the edge of the pot. Each cell corresponds to one pixel. Numbers are plotted along the ordinates, and lowercase alphabets are plotted along the abscissas. The numbers and alphabets indicate addresses for the descriptive convenience. For example, an address at the fourth column from the left and the third row from the upper side is called 3d. Hatched pixels constitute a region determined as a dust particle/flaw region on the basis of infrared image data, where tentative pixel data are written. Uppercase alphabets around the pixels represent image data groups in the periphery of the dust particle/flaw region.

The image data is grouped on the basis of image data levels or the data ratio between the R, G, and B components. For example, of the image data in the periphery of the dust particle/flaw region, a large data group is defined as a group A, a small data group is defined as a group C, and an intermediate data group is defined as a group B on the basis of their levels.

As a result, the groups A to C are assigned to pixels of portions other than the dust particle/flaw region, as shown in FIG. 21A.

The pixels may be more finely grouped. The number of groups is appropriately selected in accordance with the limitation on the calculation time or the like.

The edge of the image pattern is detected from the image data groups. To do this, for example, image data of one line near the dust particle/flaw region is extracted, and pixels whose image data greatly change are defined as the edge of the image pattern.

Figure 22A:
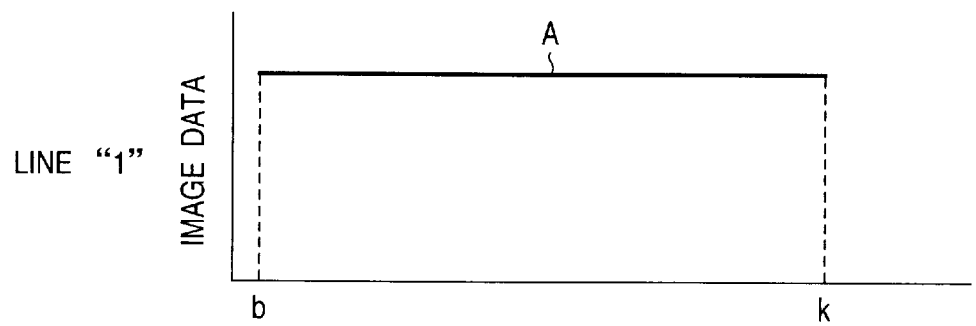
FIGS. 22A to 22D are graphs showing image data of one scan line near the dust particle/flaw region.
Figure 22B:
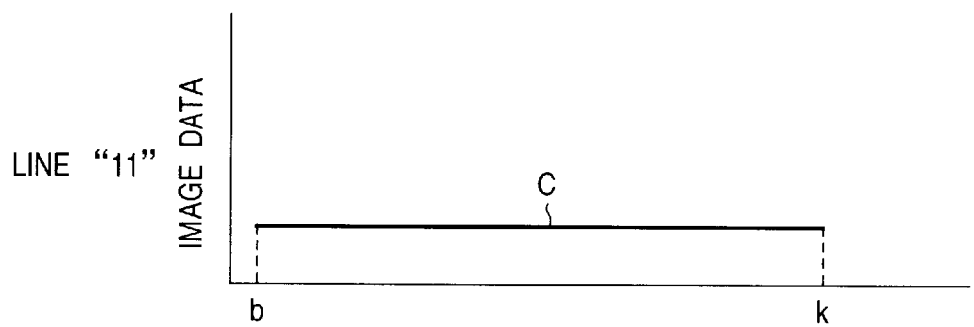
Figure 22C:
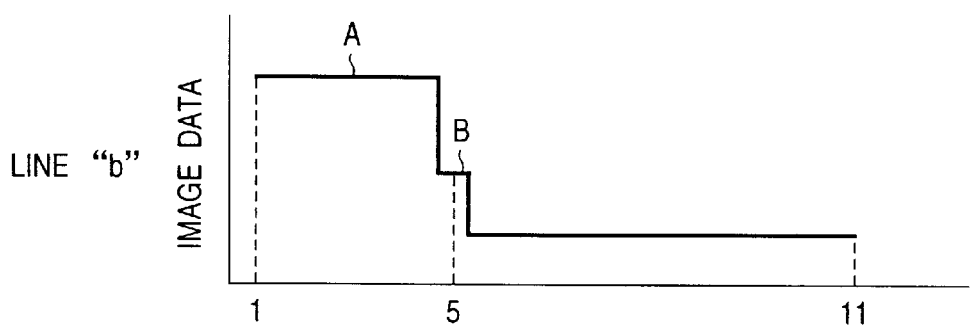
Figure 22D:
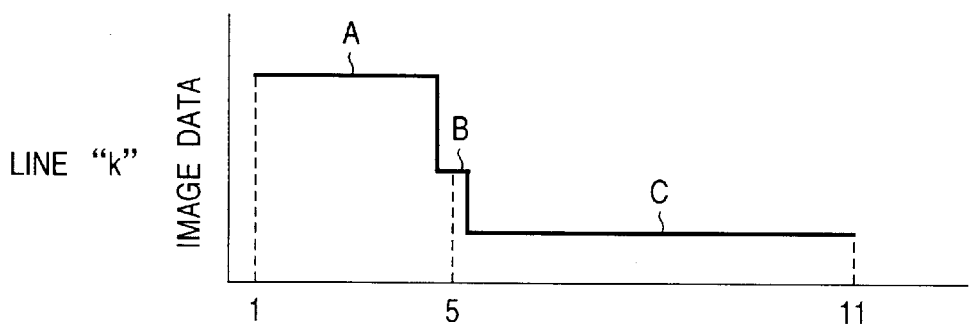
Figure 25A:
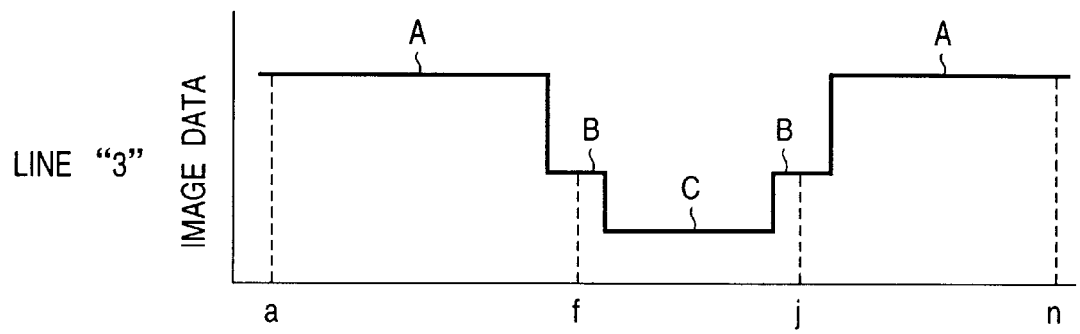
FIGS. 25A to 25D are graphs showing image data of one scan line near the dust particle/flaw region.
Figure 25B:
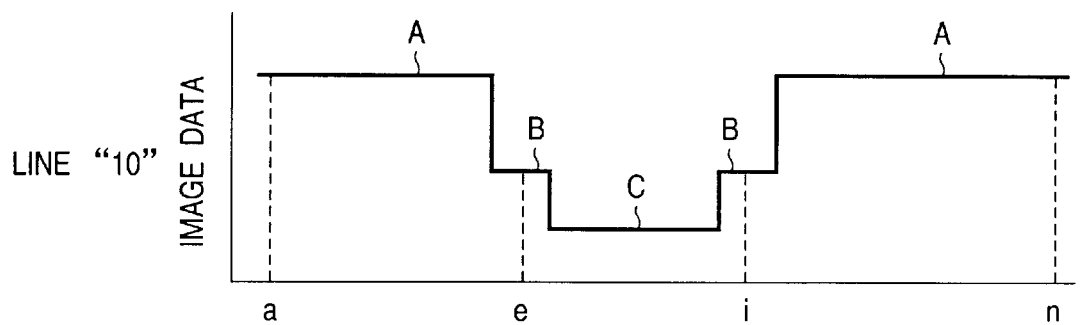
Figure 25C:
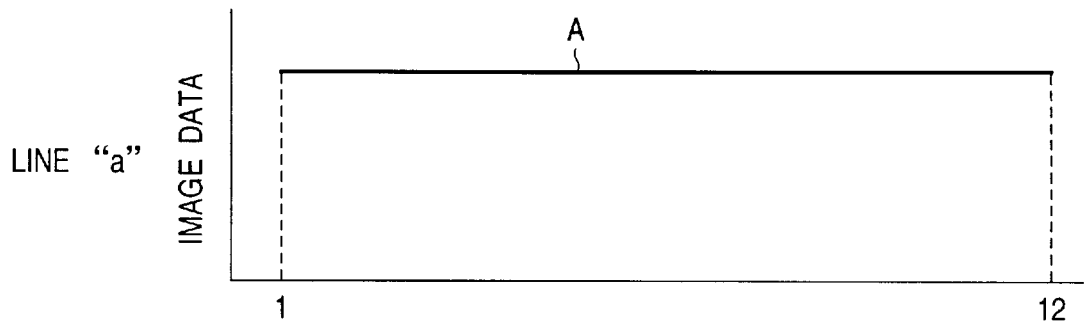
Figure 25D:
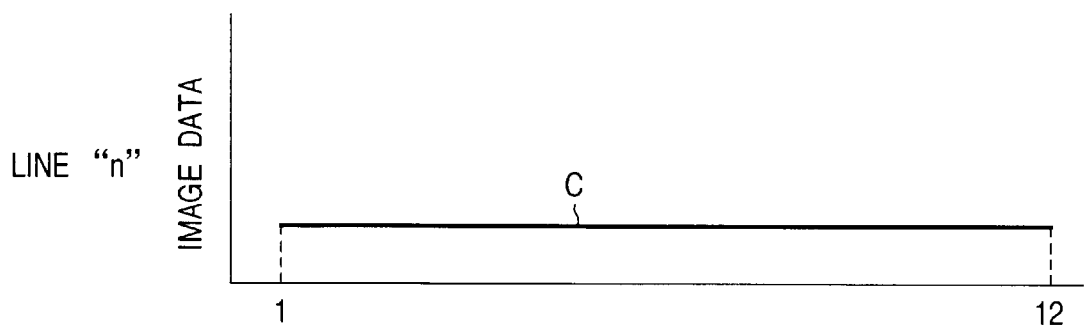

FIGS. 22A to 22D are graphs showing level changes in four line image data around the dust particle/flaw region in FIG. 21A as samples. FIG. 22A shows a level change in line "1". FIG. 22B shows a level change in line "11". FIG. 22C shows a level change in line b. FIG. 22D shows a level change in line k. FIGS. 22C and 22D show that the pixel at address 5b and the pixel at address 5k form the edge of the image pattern.

The edge portion of the image pattern is detected in this way. The pixels of the edge portion are interpolated. The two pixels at addresses 5b and 5k, which are determined to form the edge portion in FIG. 21A, are used for linear interpolation. Pixels 5c to 5j are replaced with image data of the group B, as shown in FIG. 21B. Then, the two regions on both sides of the edge are replaced with data of the group A and data of the group C, respectively, thereby ending pixel interpolation in the dust particle/flaw region (FIG. 21C).

As data for replacement, representative data of each group (average value or median value) is used. As another example, data at two ends of interpolated pixels may be used for linear approximation. For example, to interpolate pixels between pixels 4d and 4k in FIG. 21B, $(d(4k)-d(4d))/7$ is added to each pixel ($d(4k)$ is the data of the pixel 4k). In this case, $d(4e)=d(4k)+(d(4k)-d(4d))/7$. Each pixel is weighted without being linearly approximated.

A method of reading the image of a film 2 in the sixth embodiment will be described below with reference to the flow chart in FIG. 19. This image reading method is stored in a storage area in a film scanner control circuit 12 as a program. This program may be input and controlled from an external device. Any storage form such as a floppy disk, CD-ROM, or MO can be employed.

Processing in steps S1 to S11 is the same as in steps S1 to S11 in FIG. 1. With this processing, infrared and visible light image data are stored.

(Step S192) An image information processing circuit 12f (extraction means) groups pixel data around the visible light image data in the dust particle/flaw region prepared in step S8.

(Step S193) The image information processing circuit 12f detects (extracts) the edge portion of the image pattern on the basis of the result of grouping in step S192.

(Step S194) The edge portion data is linearly interpolated.

(Step S195) The image information processing circuit 12f (data change means) replaces regions other than the edge portion with group data.

(Step S196) The image information is output.

With the above arrangement and flow, even when a dust particle or flaw is present on the film, image data simply corrected in a short time is obtained.

(Seventh Embodiment)

In the sixth embodiment, the correction method used when the image pattern has only one edge has been described. In the seventh embodiment, an example wherein an image pattern has a plurality of edges will be described.

The seventh embodiment of the present invention will be described with reference to FIGS. 23 to 25D. The film scanner of the seventh embodiment also has the same arrangement as in the first embodiment described with reference to FIGS. 10 to 12, and a detailed description thereof will be omitted.

FIG. 23 is a flow chart for explaining the operation of the film scanner according to the seventh embodiment. FIGS. 24A to 24C are enlarged views showing a portion ⓑ of visible light image data shown in FIG. 20C and correction of that portion. FIGS. 25A to 25D show image data (any one of R, G, and B) of vertical and horizontal lines around the dust particle/flaw region.

Image data grouping and detection of the edge of the image pattern are performed in ways similar to those of the sixth embodiment. On the basis of the image data around the dust particle/flaw region in FIGS. 25A and 25B, the edge pixels is defined as 3f, 3j, 10e, and 10i. In the sixth embodiment, since the image pattern has one edge, and the number of peripheral pixels is two, interpolation between the two pixels suffices. In the seventh embodiment, however, the image pattern has two edges for the image omitted due to a dust particle or flaw, as shown in FIG. 24A. For this reason, the pixels to be used in interpolation are not uniquely determined. The edge pixels are further grouped. For example, the pixels are divided into groups of leading-edge pixels and trailing-edge pixels. In this case, the edge pixels 3f and 10e form one group, and the edge pixels 3j and 10i another group.

The pixels of the edge portion are interpolated. First, the pixels 3f and 10e and pixels 3j and 10i are used for linear interpolation. As shown in FIG. 24B, pixels 4f, 5f, 6f, 7f, 8e, 9e, and 10e, and pixels 3j, 4j, 5j, 6j, 7i, 8i, 9i, and 10i are replaced with image data of a group B. Then, two regions on both sides of the edge are replaced with the data of a group A and the data of a group C, respectively, thereby ending pixel interpolation in the dust particle/flaw region (FIG. 24C).

As data for replacement, representative data of each group (average value or median value) is used, as described in the sixth embodiment. Alternatively, data at two ends of interpolated pixels is used for linear approximation.

A method of reading the image of a film 2 in the seventh embodiment will be described below with reference to the flow chart in FIG. 23. This image reading method is stored in a storage area in a film scanner control circuit 12 as a program. This program may be input and controlled from an external device. Any storage form such as a floppy disk, CD-ROM, or MO can be employed.

Processing in steps S1 to S11 is the same as in steps S1 to S11 in FIG. 1. With this processing, infrared and visible light image data are stored.

(Step S232) Pixel data around the visible light image data in the dust particle/flaw region prepared in step S8 are grouped.

(Step S233) An image information processing circuit 12f (extraction means) detects (extracts) edge portions of the image pattern on the basis of the result of grouping in step S232.

(Step S234) The edge portion pixels are grouped on the basis of the peripheral pixel data.

(Step S235) Each edge portion data is linearly interpolated.

(Step S236) The image information processing circuit 12f (data change means) replaces regions other than the edge portion with group data.

(Step S237) The image information is output.

With the above arrangement and flow, even when a dust particle or flaw is present on the film, image data simply corrected in a short time can be obtained.

(Eighth Embodiment)

In the seventh embodiment, the edges of the image pattern are obtained by interpolation using group data of the peripheral data. In the eighth embodiment, for an edge of an image pattern, pixels close to each other are classified into the same groups.

The eighth embodiment of the present invention will be described with reference to FIGS. 26 to 27C. The film scanner of the eighth embodiment has the same arrangement as in the first embodiment described with reference to FIGS. 10 to 12, and a detailed description thereof will be omitted.

Figure 26:
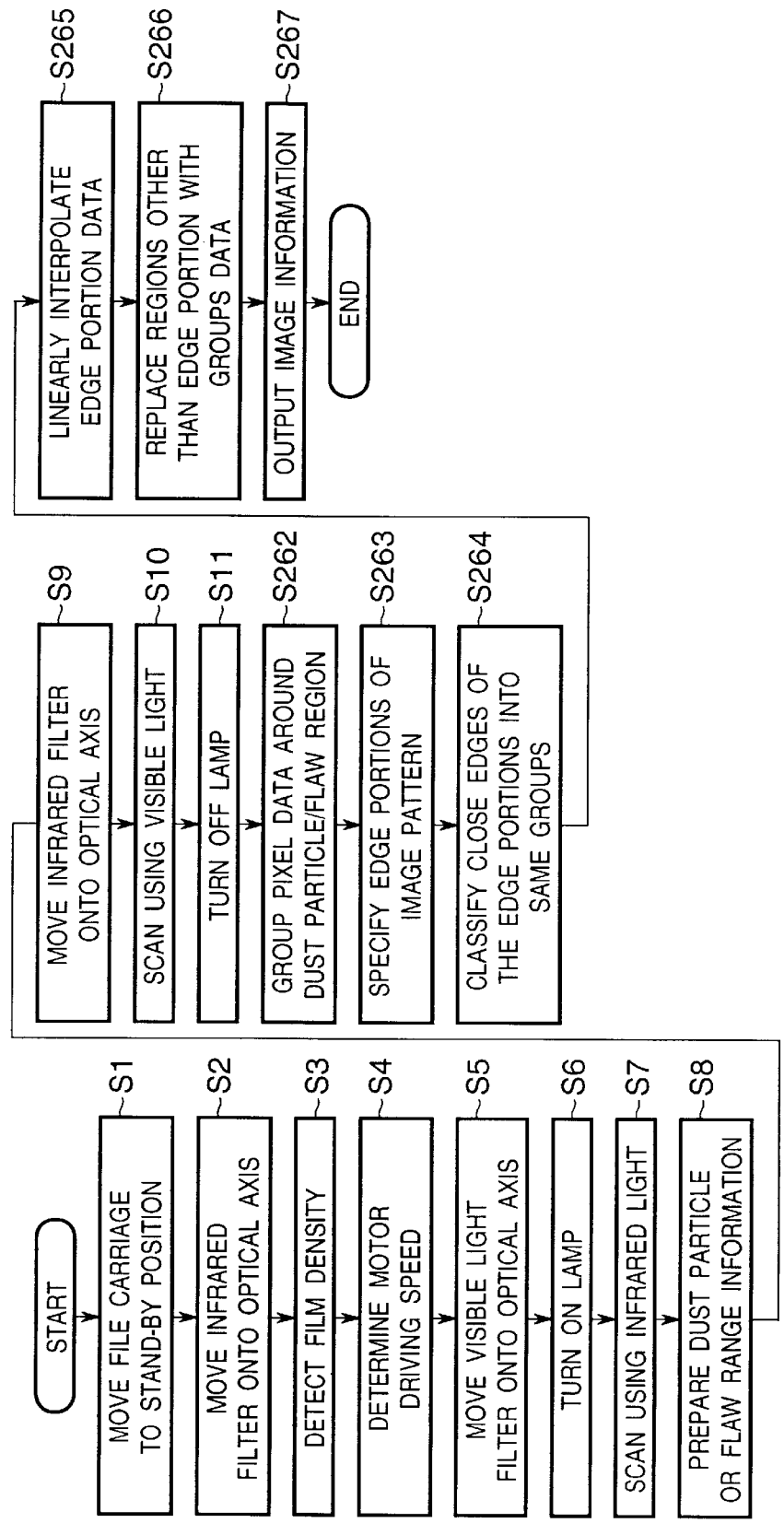
FIG. 26 is a flow chart for explaining the operation of a film scanner according to the eighth embodiment.
Figures 27A, 27B, 27C:
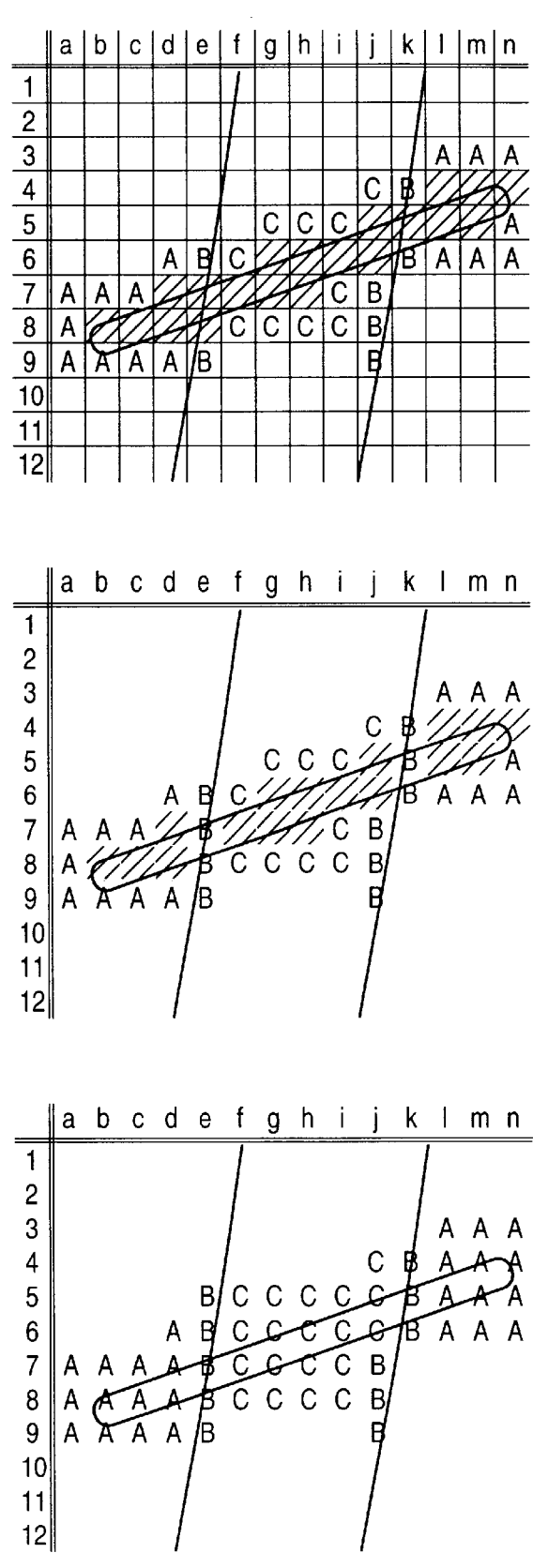

FIG. 26 is a flow chart for explaining the operation of the film scanner according to the eighth embodiment. FIGS. 27A to 27C are enlarged views showing a portion ⓒ of visible light image data shown in FIG. 20C and correction of that portion.

Image data grouping and detection of the edge of the image pattern are performed in ways similar to those of the sixth embodiment. The edge pixels can be defined as 6e, 9e, 4k, and 7j. As in the sixth embodiment, since the image pattern has two edges, the pixels to be used in interpolation are not uniquely determined. In the eighth embodiment, the edge pixels are grouped in units of edges close to each other. Since a dust particle or flaw often has a long shape, the dust particle or flaw rarely causes omission of image data on the edge of an image pattern. When pixels close to each other are classified into the same groups, the edge pixels 6e and 9e and the edge pixels 4k and 7j form groups, respectively.

The pixels of the edge portion are interpolated. First, the pixels 6e and 9e and pixels 4k and 7j are used for linear interpolation. As shown in FIG. 27B, pixels 6e to 9e and pixels 4k to 7j are replaced with image data of a group B. Then, two regions on both sides of the edge are replaced with the data of a group A and the data of a group C, respectively, thereby ending pixel interpolation in the dust particle/flaw region (FIG. 27C).

As data for replacement, representative data of each group (average value or median value) is used, as described in the sixth embodiment. Alternatively, data at two ends of interpolated pixels is used for linear approximation.

A method of reading the image of a film 2 in the seventh embodiment will be described below with reference to the flow chart in FIG. 26. This image reading method is stored in a storage area in a film scanner control circuit 12 as a program. This program may be input and controlled from an external device. Any storage form such as a floppy disk, CD-ROM, or MO can be employed.

Processing in steps S1 to S11 is the same as in steps S1 to S11 in FIG. 1. With this processing, infrared and visible light image data are stored.

(Step S262) Pixel data around the visible light image data in the dust particle/flaw region prepared in step S8 are grouped.

(Step S263) An image information processing circuit 12f (extraction means) detects (extracts) edge portions of the image pattern on the basis of the result of grouping in step S262.

(Step S264) Close pixels of the edge portion pixels are classified into the same groups.

(Step S265) Each edge portion data is linearly interpolated.

(Step S266) The image information processing circuit 12f (data change means) replaces regions other than the edge portion with group data.

(Step S267) The image information is output.

With the above arrangement and flow, even when a dust particle or flaw is present on the film, high-quality image data simply corrected in a short time can be obtained.

In the fourth to eighth embodiments, before data of a dust particle or flaw is corrected, the dust particle/flaw region is more preferably corrected by one of the methods of the first to third embodiments.

In steps S143 and S173 of the fourth and fifth embodiments, data of a dust particle or flaw is preferably corrected by one of the methods of the sixth to eighth embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image reading apparatus, comprising:
    light-emitting means for irradiating an original with invisible light and visible light;
    photodetection means for detecting light from the original irradiated by said light-emitting means to output image data;
    region detection means for detecting a first image region recognized as anomaly in first image data output by said photodetection means when the original is irradiated with the invisible light from said light-emitting means, and detecting a second image region, corresponding to the first image region, recognized as anomaly in second image data output by said photodetection means when the original is irradiated with the visible light from said light-emitting means;
    shift correction means for correcting a shift between the first image region and the second image region;
    determination means for determining, as an anomalous region, a region in the second image data, which corresponds to the first image region, and
    anomaly correction means for correcting image data in the anomalous region determined by said determination means.

2. The apparatus according to claim 1, wherein said region detection means detects regions having pixel values not more than a predetermined value in the first and second image data as the first and second image regions.

3. The apparatus according to claim 1, wherein said shift correction means expands the first image region such that the first image region includes the second image region.

4. The apparatus according to claim 1, wherein said light-emitting means irradiates the original with infrared light as the invisible light.

5. The apparatus according to claim 1, wherein said photodetection means detects light transmitted through a transparent original to output image data.

6. The apparatus according to claim 1, wherein said image reading apparatus comprises a film scanner for reading a film original.

7. The apparatus according to claim 1, wherein said anomaly correction means corrects the second image data by amplifying the pixel values of the second image data in the anomalous region.

8. The apparatus according to claim 7, wherein said anomaly correction means amplifies the pixel values in the anomalous region to a value approximately equal to pixel values in peripheral region of the anomalous region.

9. The apparatus according to claim 7, wherein said anomaly correction means amplifies the pixel values in the anomalous region such that an average value of the pixel values in the anomalous region matches an average value of the pixel values in the peripheral region of the anomalous region.

10. The apparatus according to claim 1, wherein said anomaly correction means groups peripheral region of the anomalous region in accordance with pixel values and corrects pixels in the anomalous region, which are sandwiched by pixels of a first group of the peripheral region, to pixel values in the first group.

11. An image reading apparatus, comprising:
light-emitting means for irradiating an original with invisible light and visible light;
photodetection means for detecting light from the original irradiated by said light-emitting means to output image data;
region detection means for detecting a first image region recognized as anomaly in first image data output by said photodetection means when the original is irradiated with the invisible light from said light-emitting means, and detecting an anomalous region corresponding to the first image region in second image data output by said photodetection means when the original is irradiated with the visible light from said light-emitting means;
anomaly correction means for correcting the second image data by amplifying pixel values in the anomalous region detected by said region detection means; and wherein when the pixel values of the second image data in the anomalous region are not less than predetermined value, said anomaly correction means amplifies the pixel values in the anomalous region.

12. The apparatus according to claim 11, wherein said anomaly correction means amplifies the pixel values in the anomalous region to a value approximately equal to pixel values in peripheral region of the anomalous region.

13. The apparatus according to claim 12, wherein said anomaly correction means amplifies the pixel values in the anomalous region such that an average value of the pixel values in the anomalous region matches an average of the pixel values in the peripheral region of the anomalous region.

14. The apparatus according to claim 11, wherein when the pixel values in the anomalous region are not more than a predetermined value, said anomaly correction means group peripheral region of the anomalous region in accordance with pixel values and corrects pixels in the anomalous region, which are sandwiched by pixels of a first group of the peripheral region, to pixel values in the first group.

15. The apparatus according to claim 11, wherein said light-emitting means irradiates the original with infrared light as the invisible light.

16. The apparatus according to claim 11, wherein said photodetection means detects light transmitted through a transparent original to output image data.

17. The apparatus according to claim 11, wherein said image reading apparatus comprises a film scanner for reading a film original.

18. An image reading apparatus, comprising:
light-emitting for irradiating in an original with invisible light and visible light;
photodetection means for detecting light from the original irradiated by said light- emitting means to output image data;
region detection means for detecting a first image regio recognized as anomaly in first image data output by said photodetection means when the original is irradiated with invisible light from said light-emitting means, and detecting an anomalous region corresponding to the first image in second image data output by said photodetection means when the original is irradiated with the visible light from said light-emitting means; and
anomaly correction means for grouping peripheral region of the anomalous region detected by said region means in accordance with pixel values and correcting pixels in the anomalous region, which are sandwiched by pixels of a first group of the peripheral region, to pixel values in the first group.

19. The apparatus according to claim 18 wherein said light-emitting means irradiates the original with infrared light as the invisible light.

20. The apparatus according to claim 18 wherein said photodetection means detects light transmitted through a transparent original to output image data.

21. The apparatus according to claim 18, wherein said image reading apparatus comprises a film scanner for reading a film original.

22. An image reading method, comprising:
a irradiation step of irradiating an original with invisible light and visible light from light- emitting means;
a photodetection step of detecting light from the original irradiated in the irradiation step to output image data;
a region detection step of detecting a first image region recognized as anomaly in first image data output in the photodetection step when the original is irradiated with the invisible light in the irradiation step, and detecting a second image region recognized as anomaly in second image data output in the photodetection step when the original is irradiated with the visible light in the irradiation step;
a shift correction step of correcting a shift between the first image region and the second image region;
a determination step of determining, as an anomalous region, a region in the second image data, which corresponds to the first image regiion; and
an anomaly correction step of correcting the second image data in the anomalous region determined in the determination step.

23. The method according to claim 22, wherein the region detection step comprises detecting regions having pixel values not more than a predetermined value in the first and second image data as the first and second image regions.

24. The method according to claim 22, wherein the shift correction step comprises expanding the first image region such that the first image region includes the second image region.

25. The method according to claim 22, wherein the irradiation step comprises irradiating the original with infrared light as the invisible light.

26. The method according to claim 22, wherein the photodetection step comprises detecting light transmitted through a transparent original to output image data.

27. The method according to claim 22, wherein the photodetection step comprises detecting light transmitted through a film to output image data.

28. The method according to claim 22, wherein the anomaly correction step comprises correcting the second image data by amplifying the pixel values of the second image data in the anomalous region.

29. The method according t claim 28, wherein the anomaly correction step comprises amplifying the pixel values in the anomalous region to a value approximately equal to pixel values in peripheral region of the anomalous region.

30. The method according to claim 28, wherein the anomaly correction step comprises amplifying the pixel values in the anomalous region such that an average value of the pixel values in the anomalous region matches an average value of the pixel values in the peripheral region of the anomalous region.

31. The method according to claim 22, wherein the anomaly correction step comprises grouping peripheral region of the anomalous region in accordance with pixel values and correcting pixels in the anomalous region, which are sandwiched by pixels of a first group of peripheral region, to pixel values in the first group.

32. The method according to claim 23, wherein the anomaly correction step comprises grouping peripheral region of the anomalous region in accordance with pixel values and correcting pixels in the anomalous region, which are sandwiched by pixels of a first group of the peripheral region, to pixel values in the first group.

33. The method according to claim 32, wherein the anomaly correction step comprises amplifying the pixel values in the anomalous region to a value approximately equal to pixel values in peripheral region of the the anomalous region.

34. The method according to claim 33, wherein when the anomaly correction step comprises amplifying the pixel values in the anomalous region such that an average value of the pixel values in the anomalous region matches an average value of the pixel values in the peripheral region of the anomalous region.

35. The method according to claim 34, wherein when the pixel values in the anomalous region are not more than a predetermined value, the anomaly correction step comprises grouping peripheral region of the anomalous region in accordance with pixel values and correcting pixels in the anomalous region, which are sandwiched by pixels of a first group of the peripheral region, to pixel values in the first group.

36. The method according to claim 32, wherein the irradiatio step comprises irradiating the original with infrared light as the invisible light.

37. The method according to claim 32, wherein the photodetection step comprises detecting light transmitted through a transparent original to output image data.

38. The method according to claim 32, wherein the photodetection step comprises detecting light transmitted through a film to output image data.

39. An image reading method, comprising:

an irradiation step of irradiating an original with invisible light and visible light from light-emitting means;

a photodetection step of detection light from the original irradiated in the irradiation step to output image data;

a region detection step of detecting a first image region recognized as anomaly in first image data output in the photodetection step when the original is irradiated with the invisible light in irradiation step, and detecting an anomalous region corresponding to the first image region in second image data output in the photodetection step when the original is irradiated with the visible light in the irradiation step; and an anomaly correction step of growing peripheral region of the anomalous region detected in the region detection step in accordance with pixel values and correcting pixels in the anomalous region, which are sandwiched by pixels of a first group of the peripheral region, to pixel values in the first group.

40. The method according to claim 39, wherein the irradiation step comprises irradiating the original with infrared light as the invisible light.

41. The method according to claim 39, wherein the photodetection step comprises detecting light transmitted through a transparent original to output image data.

42. The method according to claim 39, wherein the photodetection step comprises detecting light transmitted through a film to output image data.

43. Storage medium storing a program implementing the method according to claim 22.

44. Storage medium storing a program implementing the method according to claim 32.

45. Storage medium storing a program implementing the method according to claim 39.

* * * * *

UNITED STATES PATENT AND TRADEMARK OFFICE
CERTIFICATE OF CORRECTION

PATENT NO.    : 6,832,008 B1
DATED         : December 14, 2004
INVENTOR(S)   : Hiroyuki Wada It is certified that error appears in the above-identified patent and that said Letters Patent is hereby corrected as shown below:

Column 18,
Line 52, insert -- the second -- after the word "correcting";

Column 19,
Line 42, insert -- a -- after "not less than";
Line 52, insert -- value -- after "average";
Line 58, delete "group" and insert -- groups --;

Column 20,
Line 5, insert -- means -- after "light-emitting";
Line 5, delete "in";
Line 10, delete "regio" and insert -- region --;
Line 13, insert -- the -- after "with";
Line 16, insert -- region -- after "first image";
Line 21, insert -- detection -- after "said region";
Line 53, delete "regiion" and insert -- region --;

Column 21,
Line 11, delete "t" and insert -- to --;
Line 26, insert -- the -- before "peripheral";
Line 28, delete "32. The method according to claim 23, wherein the anomaly correction step comprises grouping peripheral region of the anomalous region in accordance with pixel values and correcting pixels in the anomalous region, which are sandwiched by pixels of a first group of the peripheral region, to pixel values in the first group." and insert --32. An image reading method, comprising:

an irradiation step of irradiating an original with invisible light and visible light from light emitting means;

a photodetection step of detecting light from the original irradiated in the irradiation step to output image data;

a region detection step of detecting a first image region recognized as anomaly in first image data output in the photodetection step when the original is irradiated with the invisible light in the irradiation step, and detecting an anomalous region corresponding to the first image region in second image data output in the photodetection step when the original is irradiated with the visible light in the irradiation step;

an anomaly correction step of correcting the second imge data by amplifying pixel values in the anomalous region detected in the region detection step; and wherein when the pixel values of the second image data in the anomalous region are not less than a predetermined value, said anomaly correction means amplifies the pixel value in the anomalous region.--

UNITED STATES PATENT AND TRADEMARK OFFICE
CERTIFICATE OF CORRECTION

PATENT NO. : 6,832,008 B1
DATED : December 14, 2004
INVENTOR(S) : Hiroyuki Wada

It is certified that error appears in the above-identified patent and that said Letters Patent is hereby corrected as shown below:

Column 21 (cont'd),
Line 37, delete the second instance of "the";
Line 39, delete the word "when";

Column 22,
Line 5, delete 'irradiatio" and insert -- irradiation --;
Line 16, delete "detection" and insert -- detecting --;
Line 22, insert -- the -- after "in";
Line 27, delete "growing" and insert -- grouping --;

Signed and Sealed this

Fifth Day of July, 2005

JON W. DUDAS
*Director of the United States Patent and Trademark Office*